(12) United States Patent
Xu et al.

(10) Patent No.: US 12,095,860 B2
(45) Date of Patent: Sep. 17, 2024

(54) DATA TRAFFIC MANAGEMENT IN A COMPUTING ENVIRONMENT UTILIZING DIRECT MEMORY ACCESS FUNCTIONALITY

(71) Applicant: NetApp, Inc., San Jose, CA (US)

(72) Inventors: Houze Xu, Lexington, MA (US); Yuepeng Qi, Cary, NC (US); Yanbei Wang, Southborough, MA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/976,235

(22) Filed: Oct. 28, 2022

(65) Prior Publication Data

US 2024/0146803 A1    May 2, 2024

(51) Int. Cl.
| | |
|---|---|
| *G06F 15/16* | (2006.01) |
| *H04L 43/16* | (2022.01) |
| *H04L 47/2416* | (2022.01) |
| *H04L 67/104* | (2022.01) |
| *H04L 67/1097* | (2022.01) |

(52) U.S. Cl.
CPC .......... *H04L 67/1097* (2013.01); *H04L 43/16* (2013.01); *H04L 47/2416* (2013.01); *H04L 67/104* (2013.01)

(58) Field of Classification Search
CPC . H04L 67/1097; H04L 43/16; H04L 47/2416; H04L 67/104
USPC .................................................. 709/217, 223
See application file for complete search history.

(56) References Cited

U.S. PATENT DOCUMENTS

| | | | |
|---|---|---|---|
| 9,811,432 B2 * | 11/2017 | Kadayam | G06F 11/2082 |
| 2015/0309892 A1 * | 10/2015 | Ramasubramaniam | |
| | | | G06F 11/3027 |
| | | | 714/4.5 |
| 2015/0312337 A1 * | 10/2015 | Keremane | G06F 3/067 |
| | | | 709/217 |
| 2018/0364915 A1 * | 12/2018 | Li | G06F 12/0808 |
| 2020/0412659 A1 * | 12/2020 | Arditti Ilitzky | H04L 43/087 |

FOREIGN PATENT DOCUMENTS

WO    WO-2016177126 A1 *  11/2016

* cited by examiner

*Primary Examiner* — Liang Che A Wang
(74) *Attorney, Agent, or Firm* — Jaffery Watson Hamilton & DeSanctis, LLP

(57) ABSTRACT

Data traffic management in a computing environment utilizing direct memory access functionality is disclosed. A management agent is configured to operate within a storage node. The management agent includes a storage interface to communicate with a first set of storage devices, a management memory interface to communicate with a first management memory, and an interconnect (IC) interface to communicate with a remote peer node. The management agent controls data traffic between the storage node and the peer node to provide at least mirroring of the first management memory to the peer node and mirroring of a second management memory on the peer node to the storage node. The management agent further controls the data traffic using a traffic control approach selected based on at least a performance evaluation of an IC fabric accessible via the IC interface.

22 Claims, 13 Drawing Sheets

DATA TRAFFIC MANAGEMENT IN A COMPUTING ENVIRONMENT UTILIZING DIRECT MEMORY ACCESS FUNCTIONALITY

FIELD

The present disclosure generally relates to data storage systems. More particularly, the present disclosure relates to high-availability (HA) systems having storage solutions that communicate over at least an interconnect (IC) fabric between storage nodes.

BACKGROUND

Multiple storage nodes can be used to provide a distributed storage architecture configured to service storage requests issued by one or more client devices. Storage requests are directed to data stored on storage devices coupled that are part of storage nodes. Data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. Management of data traffic on the storage devices can be a complex task that, if done inefficiently, can result in unnecessary latencies and other undesirable results including possibly loss of critical data.

SUMMARY

Approaches and architectures for managing data traffic between high availability (HA) nodes are described. In an example, a first HA node has a first set of storage devices and a first management memory, and a second HA node has a second set of storage devices and a second management memory. The first management memory is mirrored to the second HA node and the second management memory is mirrored to the first HA node.

An interconnect (IC) fabric connects the first HA node with the second HA node and has an associated management agent to control data traffic between the first HA node and the second HA node over the IC fabric to provide a reliable connection between the first HA node and the second HA node. In some examples, the management agent controls the IC fabric data traffic using one of: a request-based approach, a packet-based approach, and a segment-based approach.

The request-based approach is used to manage IC fabric traffic based on the number of outstanding requests. The packet-based approach is used to manage IC fabric traffic based on the number of outstanding packets. The segment-based approach is used to manage IC fabric traffic based on the number of outstanding packet segments. The traffic management approach to be utilized can be based on various characteristics including, for example, IC layer request size, historical IC layer request size, expected IC layer request size, the number of remote direct memory access (RDMA) channels being used, maximum allowable packet size, buffer sizes, etc.

BRIEF DESCRIPTION OF THE DRAWINGS

The various advantages and features of the technology being described will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
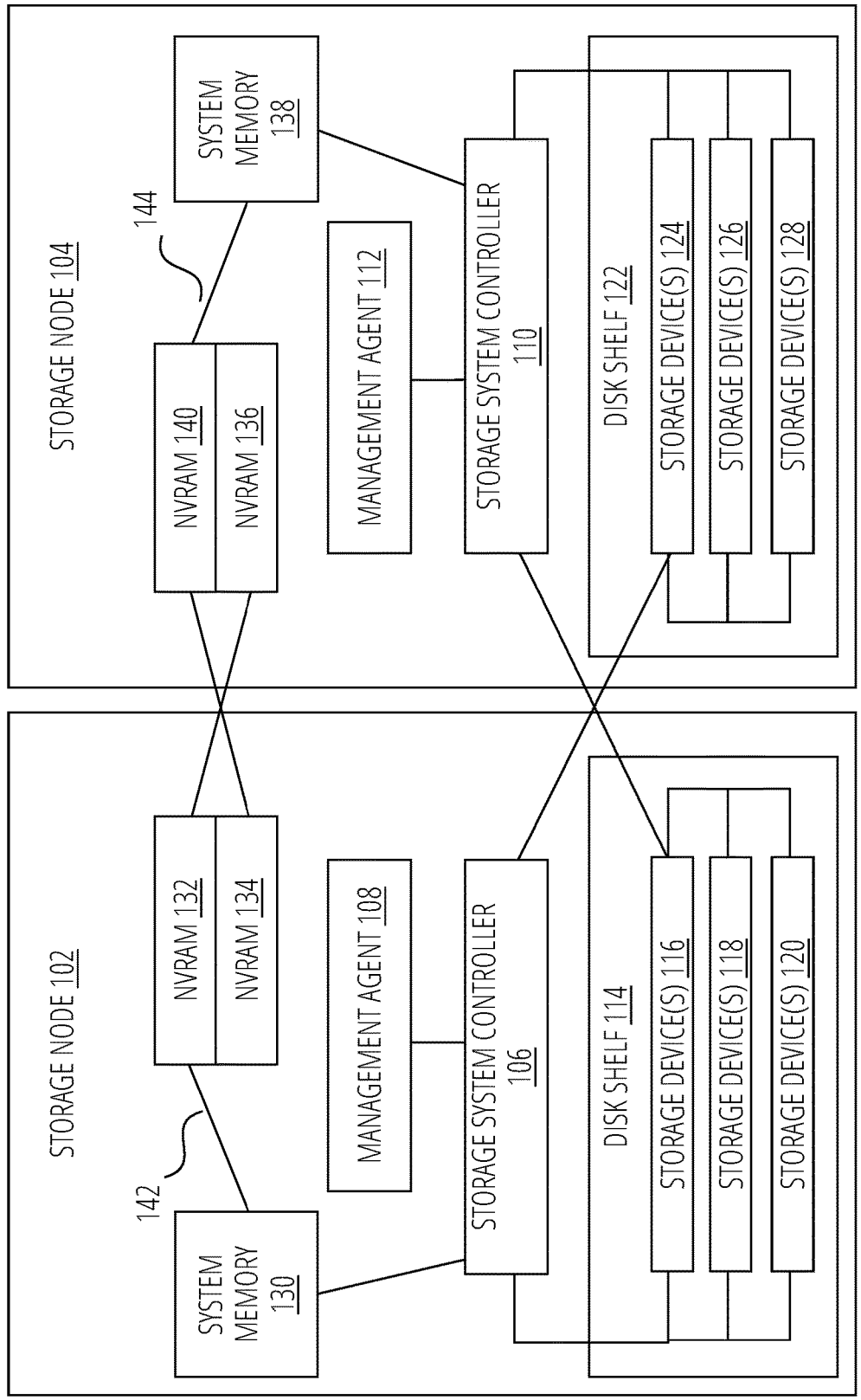
FIG. 1 is a block diagram of an example high availability (HA) computing environment having an HA pair.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

To address the need for constant data availability, various architectures described herein can be configured to support high availability (HA) computing functionality. HA availability for a storage system can be described according to two performance characteristics: the availability of data from the storage devices storing data, and the responsiveness to requests to access data on the storage devices. Failure with respect to either of these HA characteristics can be considered a data-availability failure. In response to these failures, the computing environment must provide sufficient resiliency and recoverability to support the desired HA characteristics.

At a system level, the computing architecture can include one or more HA pairs that function to provide the HA computing functionality described above. In some examples, a HA pair includes two identical storage controllers that serve data independently during normal operation. In the event of a storage controller failure of either in the HA pair, a failover can occur, and the non-failed storage controller can service requests to the failed storage controller.

In some of the example architectures described below, cross-site HA distributed cloud storage systems (e.g., cross-site HA storage solutions) provide and monitor multiple interconnect (IC) channels (e.g., multiple virtual channels for a virtual implementation) between storage nodes for improved performance. Multiple channels can be provided between a first storage node and a second storage node with each channel having a separate network connection for packets of a transport layer session. In some example architectures, remote direct memory access (RDMA) channels over the interconnect fabric can be utilized to support HA functionality.

In an example, a software implementation of RDMA can be used for data transfer including mirroring of data from a first storage node to a second storage node. In an example, the User Datagram Protocol (UDP) is used in a transport layer for transporting data between source and destination nodes in some cloud volume solutions. One or more RDMA channels can be utilized to transfer log data between storage devices of HA pair nodes. In some examples, each channel has its own receive queue.

In an example, each channel can have its own source and destination port. Receive-Side Scaling (RSS), also known as multi-queue receive, distributes network receive processing across several hardware-based receive queues, allowing inbound network traffic to be processed by multiple processors. RSS does not guarantee a separate receive queue for each channel. While these mechanisms can improve throughput over the interconnect mechanisms, uncontrolled traffic on the RDMA infrastructure can result in packet loss and/or other undesirable results caused by, for example, traffic spikes.

In order to provide a more reliable (i.e., non-dropping) and robust HA computing environment, various traffic management mechanisms can be provided to reduce (or eliminate) traffic spikes and other undesirable conditions, which can provide more efficient data transfer with packet loss reduced (or eliminated). In the examples provided, the traffic management mechanisms are applied to the IC transport layer between pairs of HA nodes (and/or within clusters of HA nodes). The example traffic management mechanisms described below are based on managing the number of outstanding IC requests, managing the number of outstanding packets, or managing the number of outstanding packet segments.

The selection of which traffic management approach to use can be based on various characteristics of the traffic being managed (e.g., IC layer request size) and/or characteristics of the underlying infrastructure, which can include, for example, the number of RDMA channels being used, maximum allowable packet size, buffer sizes, etc.

The architectures and techniques described herein can be implemented to enable more efficient data transfer (e.g., any type of data transfer, replicate copies of journal log of client data transfer requests) over interconnect mechanisms between a first storage node to a second storage node over one or more interconnect channels. Data transfer over the interconnect channel(s) can be used to backup critical data (e.g., log data), among other purposes. A data backup technique known as "mirroring" involves backing up data stored at a primary site (e.g., a first storage node) by replicating a copy (a mirror image) of the data at a remote secondary site (e.g., a second storage node). If data is lost at the primary storage site or the primary storage site becomes unavailable, the data can be recovered from the secondary storage site.

FIG. 1 is a block diagram of an example high availability (HA) computing environment having an HA pair. In the example of FIG. 1, storage node 102 and storage node 104 can be located within the same location (e.g., same data center) or storage node 102 and storage node 104 can be located in different locations (e.g., different data centers). Any number of HA nodes can be supported utilizing the traffic management approaches described herein.

As discussed above, HA infrastructures are used for mission-critical environments where computing resources are required to continue functioning when one or more components fail. HA infrastructures provide resource redundancy so that components critical to continued operation have a corresponding redundant component that can be used in case of failure. HA infrastructures also provide monitoring including, for example, collection of data from various systems determining when a component is failing or has failed. HA infrastructures further provide failover capabilities to switch from a failing or failed component to the corresponding redundant component. Some or all of the functionality to support HA operation can be provided by one or more components or layers of ONTAP software available from NetApp, Inc. of San Jose, CA, which can be implemented in (or executed by) one or more components of the HA nodes (e.g., storage system controller 106 and/or management agent 108 in storage node 102, storage system controller 110 and/or management agent 112 in storage node 104). Other storage management system architectures can also be supported.

In an HA pair configuration, the primary storage site receives and responds to various read and write requests from client devices. In a system that handles large volumes of requests, it may be impractical to commit data modification requests to the mass backend storage devices connected to the storage nodes every time a data modification request is received from a client because backend storage device/disk accesses tend to take a relatively long time compared to in-memory operations. Therefore, the primary storage site may instead hold write requests in memory temporarily and only periodically save the modified data to the mass storage devices, such as every few seconds. The event of saving the modified data to the mass storage devices is called a consistency point. At a consistency point, the primary storage site saves any data that was modified by the write requests to its local mass storage devices and triggers a process of updating the data stored at the mirror secondary storage site to reflect an updated primary volume at the primary storage site.

In this approach, there is a small risk of a system failure occurring between consistency points, causing the loss of data modified after the last consistency point. Consequently, in at least one approach, the primary storage site includes a non-volatile (NV) random access memory (NVRAM) in which the NV memory is used to maintain a journal log of data modification requests received from clients since the last consistency point. The journal log includes a separate entry for each data modification request received from a client since the last consistency point. Each log entry includes information related to the data modification requests as received from the storage client including the new data required to be committed to the storage. The log is used in the event of a failure, to recover and commit the data since the last consistency point that would otherwise be lost. In the event of a failure, it may be possible to replay the log to reconstruct the state of stored data to recover from the failure. In one example, after each consistency point is completed, the log holding entries committed as part of last consistency point is discarded and a new log is started.

In one example, to protect against a failure of the primary storage site (including journal log), an approach called clustered failover (CFO) is used in which the primary and the secondary storage sites operate as high availability partners and are connected via one or more interconnect (IC) channels to mirror log entries across the interconnect channels between the high-availability partners. In the event of failure of a node, its high-availability partner replays the log from its copy to reconstruct an up-to-date version of the stored data. Therefore, it is important that this log be replicated to its HA partner and is always up to date across all its copies. This also implies that any incoming data-modification request be committed (e.g., via IC) across all copies of the log before the data-modification request is acknowledged back to the client.

The example illustrated in FIG. 1 is that of a single HA pair; however, any number of HA pairs can be supported using the approaches and architectures described. The example HA pair configuration includes two nodes (e.g., storage node 102, storage node 104) that provide a pair of matching storage system controllers (e.g., storage system controller 106, storage system controller 110). Each storage system controller has a corresponding disk shelf. For example, storage system controller 106 is coupled with disk shelf 114 that includes storage device(s) 116, storage device(s) 118 and storage device(s) 120. Similarly, storage system controller 110 is coupled with disk shelf 122 that includes storage device(s) 124, storage device(s) 126 and storage device(s) 128. In general, a disk shelf can include any number of physical devices that can be of various device types (e.g., hard disk drive (HDD), solid state drive (SSD), hybrid).

Each storage system controller is further connected with the disk shelves of the other storage system controller. In the example of FIG. 1, storage system controller 106 is coupled with storage device(s) 124, storage device(s) 126 and storage device(s) 128 of disk shelf 122. Similarly, storage system controller 110 is coupled with storage device(s) 116, storage device(s) 118 and storage device(s) 120 of disk shelf 114. Storage system controller 106 and storage system controller 110 can be controlled by management agents (e.g., management agent 108, management agent 112) that can provide or support the functionality of, for example, ONTAP software as mentioned above. In the example of FIG. 1, storage system controller 106 is controlled by management agent 108, and storage system controller 110 is controlled by management agent 112. Alternatively, other storage system controller management software can be supported.

Management agent 108 controls the operation of storage system controller 106 with respect to the data storage resources of storage node 102, which in the example of FIG. 1, include disk shelf 114, system memory 130, NVRAM 132 and NVRAM 134. Management agent 108 also monitors the availability status of storage node 104. System memory 130 provides memory for operations within storage node 102. NVRAM 132 can be used for log data and/or other data related to operations within storage node 102. Contents of NVRAM 132 are mirrored to NVRAM 136.

Management agent 112 controls the operation of storage system controller 110 with respect to the data storage resources of storage node 104, which in the example of FIG. 1, include disk shelf 122, system memory 138, NVRAM 140 and NVRAM 136. Management agent 112 also monitors the availability status of storage node 102. System memory 138 provides memory for operations within storage node 104. NVRAM 140 can be used for log data and/or other data related to operations within storage node 104. Contents of NVRAM 140 are mirrored to NVRAM 134.

The mirroring operations between storage node 102 and storage node 104 (e.g., between NVRAM 132 and NVRAM 136, between NVRAM 140 and NVRAM 134) can be accomplished over IC channels and using the traffic management approaches described herein. Various specific configurations and management techniques are described in greater detail below.

Figure 2:
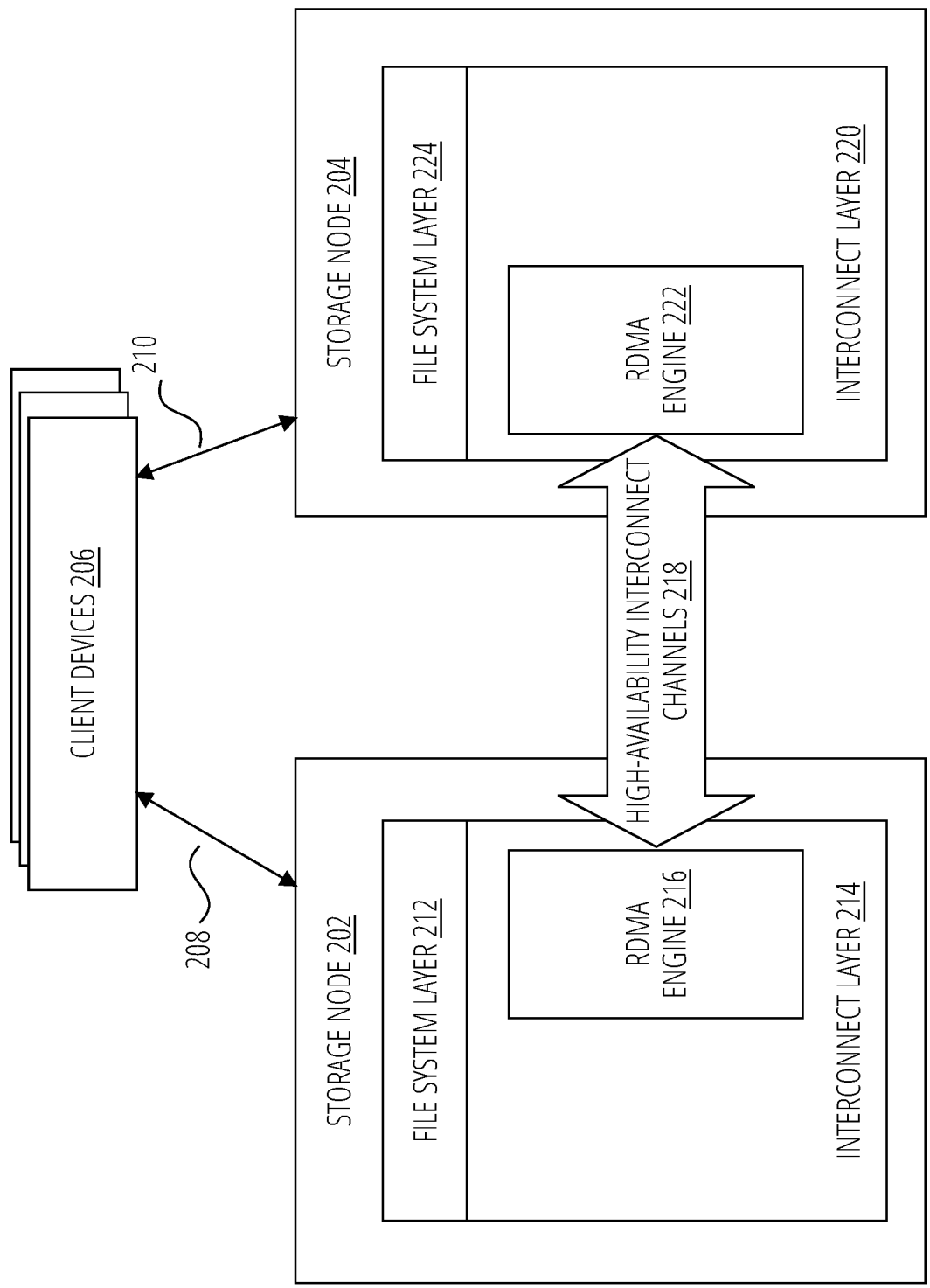
FIG. 2 is a block diagram of client devices coupled with a HA pair that are connected to each other via one or more high-availability interconnect channels (HAICs).

FIG. 2 is a block diagram of client devices coupled with a HA pair that are connected to each other via one or more high-availability interconnect (HAIC) channels. The storage nodes of FIG. 2 provide a conceptual illustration of the functionality provided by storage nodes. The example storage nodes of FIG. 1 provide an example physical implementation of a storage node.

In various examples described herein, multiple storage nodes (e.g., storage node 202 and storage node 204) may be part of a storage solution providing high availability (HA) and/or disaster recovery (DR) in which the storage nodes reside in different fault domains (e.g., power and/or networking failure domains) and/or in different regions (e.g., geographically distributed data centers, private or public cloud provider availability zones). Depending upon the particular implementation, one or both of the storage nodes may be represented in physical or virtual form. Non-limiting examples of storage nodes in physical form include network storage systems or appliances that are capable of supporting one or both of Network Attached Storage (NAS) and Storage-Area Network (SAN) accessibility from a single storage pool, which may be referred to as Fabric Attached Storage (FAS). A storage node represented in virtual form having an operating system that includes a software stack (e.g., file system layer, an interconnect (IC) layer) may be implemented as a virtual machine (VM) or container within a private or public cloud (e.g., cloud service provider). A system memory of the VM or container can store data (e.g., non-volatile (NV) data, NV log data).

The storage nodes may represent special purpose nodes operable to provide file services relating to the organization of information on storage devices associated with the storage nodes. A non-limiting example of such special purpose node includes a "filer," which may represent a high-performance all flash FAS (AFF) storage array scalable to terabytes of data that presents storage over the network using various protocols (e.g., Internet small computer system interface (iSCSI), Fibre Channel (FC), common Internet file system (CIFS), network file system (NFS), hypertext transfer protocol (HTTP), web-based distributed authoring and versioning (WebDAV)) or a custom protocol. The "filer" may be configured to operate according to a client/server model of information delivery to thereby allow client devices 206 to access files stored on a server, e.g., the filer. In this model, the client may comprise an application, such as a database application, executing on a computer that "connects" to the filer over a computer network, such as a point-to-point channel, shared local area network (LAN), wide area network (WAN), or virtual private network (VPN) implemented over a public network, such as the Internet. The clients may request services of a storage node by issuing input/output request(s) 208 or input/output request(s) 210 (e.g., file system protocol messages (in the form of packets) over the network).

As illustrated in FIG. 1, data served by the storage nodes may be distributed across multiple storage units embodied as persistent storage devices, such as hard disk drives (HDDs), solid state drives (SSDs), flash memory systems, or other storage devices (e.g., disk shelf 114, disk shelf 114 as illustrated in FIG. 1). The storage nodes may logically organize the data stored on the devices as volumes accessible as logical units. Each volume may be implemented as a set of data structures, such as data blocks that store data for the volume and metadata blocks that describe the data of the volume.

In the example of FIG. 2, storage node 202 has an operating system that includes file system layer 212 and interconnect layer 214, which further includes RDMA engine 216. Interconnect layer 214 may optionally include an IC transport layer (discussed in greater detail below with respect to FIG. 3), that can utilize a software implementation of Remote Direct Memory Access (RDMA), which is a mechanism for direct memory access from the memory of one computer into that of another without involving either computer's operating system. As discussed in greater detail below, RDMA engine 216 provides storage mechanisms organized as one or more queues to hold IC layer requests/packets/segments for transmission to storage node 204 based on the interconnect traffic management approaches described herein.

In an example, file system layer 212 may be a "write in-place" file system (e.g., the Berkeley fast file system) or a write-anywhere file system (e.g., the Write Anywhere File Layout (WAFL) file system available from NetApp, Inc. of San Jose, CA). Interconnect layer 214 provides an application programming interface (API) to upstream and downstream layers and abstracts the implementation of certain functionality performed on behalf of file system layer 212. For example, interconnect layer 214 may allow storage node 202 to check whether an HA or DR partner (e.g., storage node 204) is functioning and/or to mirror data (e.g., log data) to and/or from the other's nonvolatile memory via high-availability interconnect channels 218.

The HAIC channels can be, for example, virtual channels for a virtual storage node implementation. In an example, interconnect layer 214 makes use of an IC transport layer to encapsulate RDMA frames within Ethernet packets for transmission via one of the HAIC channels. Example packet structures and example approaches for management of packet transmission are described in greater detail below. Specifics of Ethernet packets and uses thereof can be found in Institute of Electrical and Electronics Engineers (IEEE) Standard 802.3 and related standards.

Interconnect layer 220, which further includes RDMA engine 222 provides an API to upstream and downstream layers and abstracts the implementation of certain functionality performed on behalf of file system layer 224. RDMA engine 222 provides storage mechanisms organized as one or more queues to hold IC layer requests/packets/segments for transmission to storage node 202 based on the interconnect traffic management approaches described herein.

Interconnect layer 220 may allow storage node 204 to check whether an HA or DR partner (e.g., storage node 202) is functioning and/or to mirror data (e.g., log data) to and/or from the other's nonvolatile memory via one or more high-availability interconnect (HAIC) channels (e.g., high-availability interconnect channels 228). In an example, interconnect layer 220 makes use of an IC transport layer to encapsulate RDMA frames within Ethernet packets for transmission via one of the HAIC channels.

Depending upon the particular configuration, storage requests (e.g., input/output request(s) 208 and input/output request(s) 210) may be directed to data stored on storage devices associated with one of the storage nodes. As described further below, certain types of storage requests may be logged (e.g., in the form of journal entries) to non-volatile random-access memory (NVRAM) or local VM memory (e.g., NVRAM 132, NVRAM 140) and mirrored to the other storage node (e.g., NVRAM 132 mirrored to NVRAM 136, NVRAM 140 mirrored to NVRAM 134), which may represent an HA partner or a DR partner. Similarly, the data associated with the storage request may be synchronously, semi-synchronously, or asynchronously replicated to maintain consistency between datasets of the storage nodes to support continuous availability, for example, by failing over from one storage node to the other should one of the storage nodes become inaccessible to client devices 206.

While in the context of the present example, only two storage nodes are shown, it is to be appreciated storage node 202 and/or storage node 204 may be part of a cluster of local and/or remote storage nodes depending upon the particular configuration. As such, a storage node may have more than one HA or DR partner in the same or a different data center or private or public cloud availability zone interconnected via one or more high-availability interconnect channels. Storage node 202 and storage node 204 may be physical or virtual storage nodes.

Due to differences in the level of importance of efficiency and timely completion of data transfers and/or depending upon the particular implementation, mirroring of log data to an HA partner and the mirroring of log data to a DR partner may use different channels. For example, mirroring between or among HA partners may make use of high-availability interconnect channels 218 as illustrated in FIG. 2, whereas mirroring to a DR partner may be via a different network channel (not shown).

Figure 3:
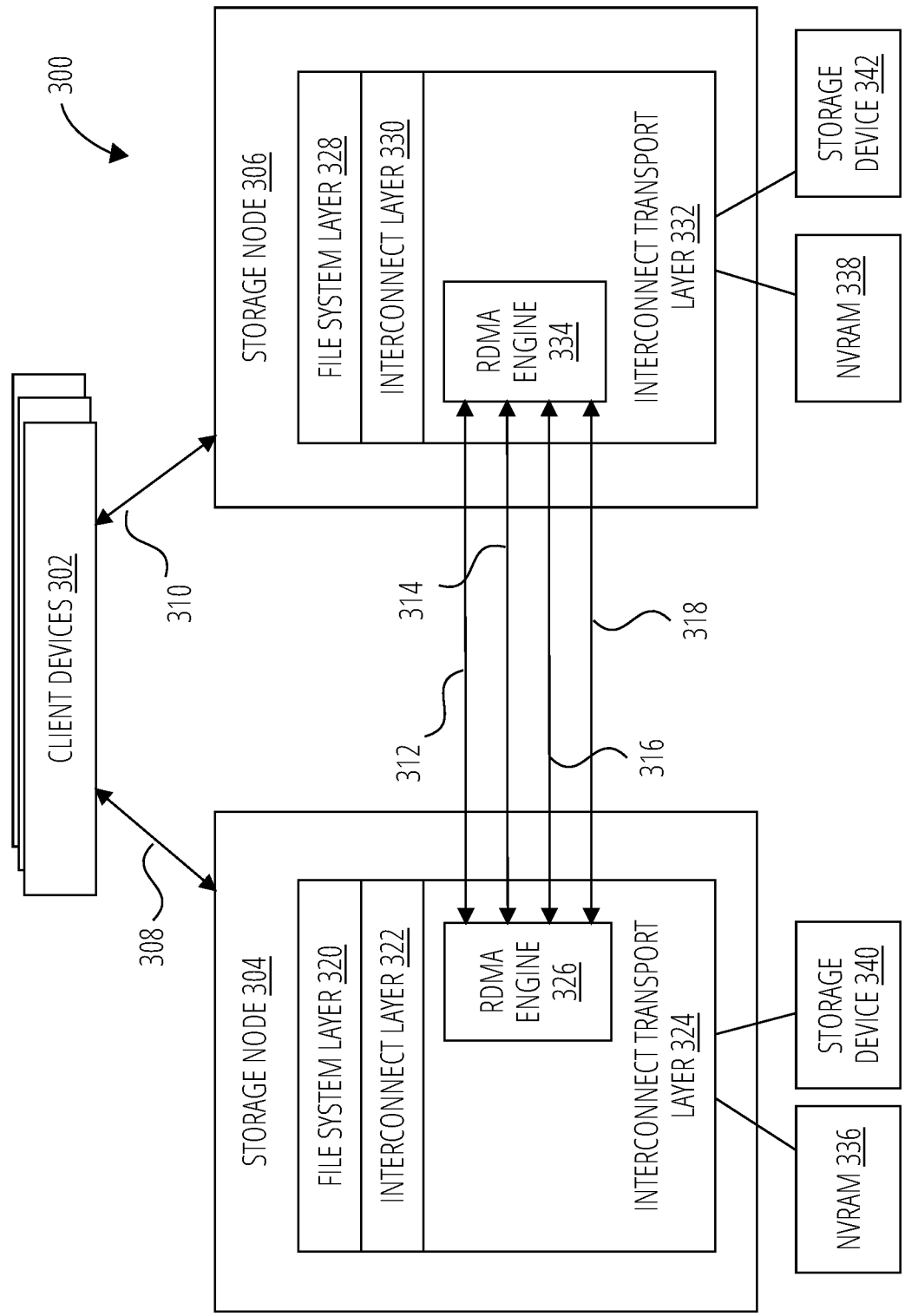
FIG. 3 is a block diagram illustrating a cloud storage system to provide multiple communication channels between storage nodes each having non-volatile random-access memory (NVRAM).

FIG. 3 is a block diagram illustrating a cloud storage system to provide multiple communication channels between storage nodes each having non-volatile random-access memory (NVRAM). In various examples described herein, users of client devices 302 of utilize resources of cloud storage system 300 having storage node 304 and storage node 306 to provide input/output request(s) 308 to storage node 304 and input/output request(s) 310 to storage node 306 via, for example, a browser-based interface presented on client devices 302.

While for sake of brevity, only two storage nodes are shown in the context of the example of FIG. 3; however, additional storage nodes and/or clusters owned by or leased by the same or different companies (data storage subscribers/customers) may be operated in accordance with the methodologies described herein and such clusters may reside in multiple data centers of different types (e.g., enterprise data centers, managed services data centers, or colocation data centers).

In the example of FIG. 3, cloud storage system 300 includes storage node 304, storage node 306, and a set of high-availability interconnect channels (e.g., HAIC channel 312, HAIC channel 314, HAIC channel 316, HAIC channel 318). Any number of IC channels can be supported (e.g., 2-8 channels). Storage node 304 and storage node 306 are coupled in communication via at least HAIC channel 312, HAIC channel 314, HAIC channel 316, HAIC channel 318, which, depending upon the particular implementation, may be part of a Local Area Network (LAN), a Wide Area Network (WAN), or the Internet. Storage node 304 and storage node 306 can be, for example, virtual storage nodes if implemented as a virtual machine (VM) or container within a private or public cloud. Other node configurations can also be supported.

In an example, storage node 304 includes an operating system having multiple software layers including file system layer 320, interconnect layer 322, and interconnect transport layer 324, which includes at least RDMA engine 326, and can communicate through, for example, a storage driver, a network interface card (NIC) driver, etc. APIs may allow communications to or between these layers. RDMA engine 326 provides storage mechanisms organized as one or more queues to hold IC layer requests/packets/segments for transmission to storage node 306 as controlled by RDMA engine 326 based on the interconnect traffic management approaches described herein.

Similarly, storage node 306 includes an operating system having multiple software layers including file system layer 328, interconnect layer 330, and interconnect transport layer 332, which includes at least RDMA engine 334, and can communicate through, for example, a storage driver, a NIC driver, etc. APIs may allow communications to or between these layers. RDMA engine 334 provides storage mechanisms organized as one or more queues to hold IC layer requests/packets/segments for transmission to storage node 304 as controlled by RDMA engine 334 based on the interconnect traffic management approaches described herein.

In the example of FIG. 3, storage node 304 and storage node 306 are organized as a cluster and provide a distributed storage architecture to service input/output request(s) 308 and input/output request(s) 310 issued by one or more client devices 302 or computer systems of the users. Data served by storage node 304 may be distributed across multiple storage units embodied as NVRAM (e.g., NVRAM 336, NVRAM 338) and persistent storage devices, including but not limited to HDDs, SSDs, flash memory systems, or other storage devices (e.g., storage device 340, storage device 342).

For data modifying operations in response to an I/O request (e.g., input/output request(s) 308, input/output request(s) 310) from client devices 302, receiving storage node (e.g., storage node 304) journals the operation locally in an operation log that can be stored locally (e.g., in NVRAM 336 for storage node 304, in NVRAM 338 for storage node 306) and then the operation is mirrored across a channel (e.g., one or more of HAIC channel 312, HAIC channel 314, HAIC channel 316, HAIC channel 318) to the peer storage node (e.g., storage node 306) before storage node 304 can acknowledge back to client devices 302. After the acknowledgement back to client devices 302, then the operation entered into the operation log can be committed to storage devices (e.g., storage device 340, storage device 342) for the corresponding storage nodes.

Two copies of data are desired for high-availability functionality and also to eliminate a single-point-of-failure causing a loss of data or access to data. If a journaling operation can complete faster, then this improves the I/O per second (IOPS) number and lowers the latency experienced by the user(s) of the client devices. In other words, efficient journaling operations results in better performance by the storage nodes.

In an example, a first portion of NVRAM 336 stores data for storage node 304 and NVRAM 336 stores mirrored data from storage node 306 (e.g., as illustrated in FIG. 1). In a similar manner, a first portion of NVRAM 338 stores data for storage node 306 and a second portion of NVRAM 338 stores mirrored data from storage node 304. If storage node 306 or any communication channels between the storage nodes experiences a failure, the second portion of NVRAM 336 provides a backup copy of data for storage node 304. If storage node 304 or any communication channels between the storage nodes experience a failure, then the second portion of NVRAM 338 provides a backup copy of data for storage node 306.

In case of hardware-based HA storage node pairs, interconnect (IC) bandwidth may not be a limiting factor due to the high-bandwidth/low-latency technologies being used (e.g., RDMA over Converged Ethernet (RoCE)/RDMA/ iWARP). However, in case of a cloud infrastructure or virtual environment, these specialized interconnect technologies may not be available, and the interconnect functionality can be realized over TCP/UDP based virtual connections.

In an example, IC layers provide multiple channels (e.g., HAIC channel 312, HAIC channel 314, HAIC channel 316, HAIC channel 318). In an example, the interconnect layer provides an RDMA transport service for a client (e.g., a file system layer) to implement multiple parallel channels (e.g., multiple virtual channels, or parallel channels for a virtual implementation) between, for example, NVRAM 336 and NVRAM 338 to provide the mirroring functionality described above.

The example architecture of FIG. 3 provides enhanced capabilities of a software stack to provide multiple flows over one or more of HAIC channel 312, HAIC channel 314, HAIC channel 316 and HAIC channel 318 with an IC transport layer being able to monitor the traffic over one or more of HAIC channel 312, HAIC channel 314, HAIC channel 316 and HAIC channel 318 utilizing one or more of the approaches described herein to reduce traffic spikes and/or other undesirable traffic conditions.

Figure 4:
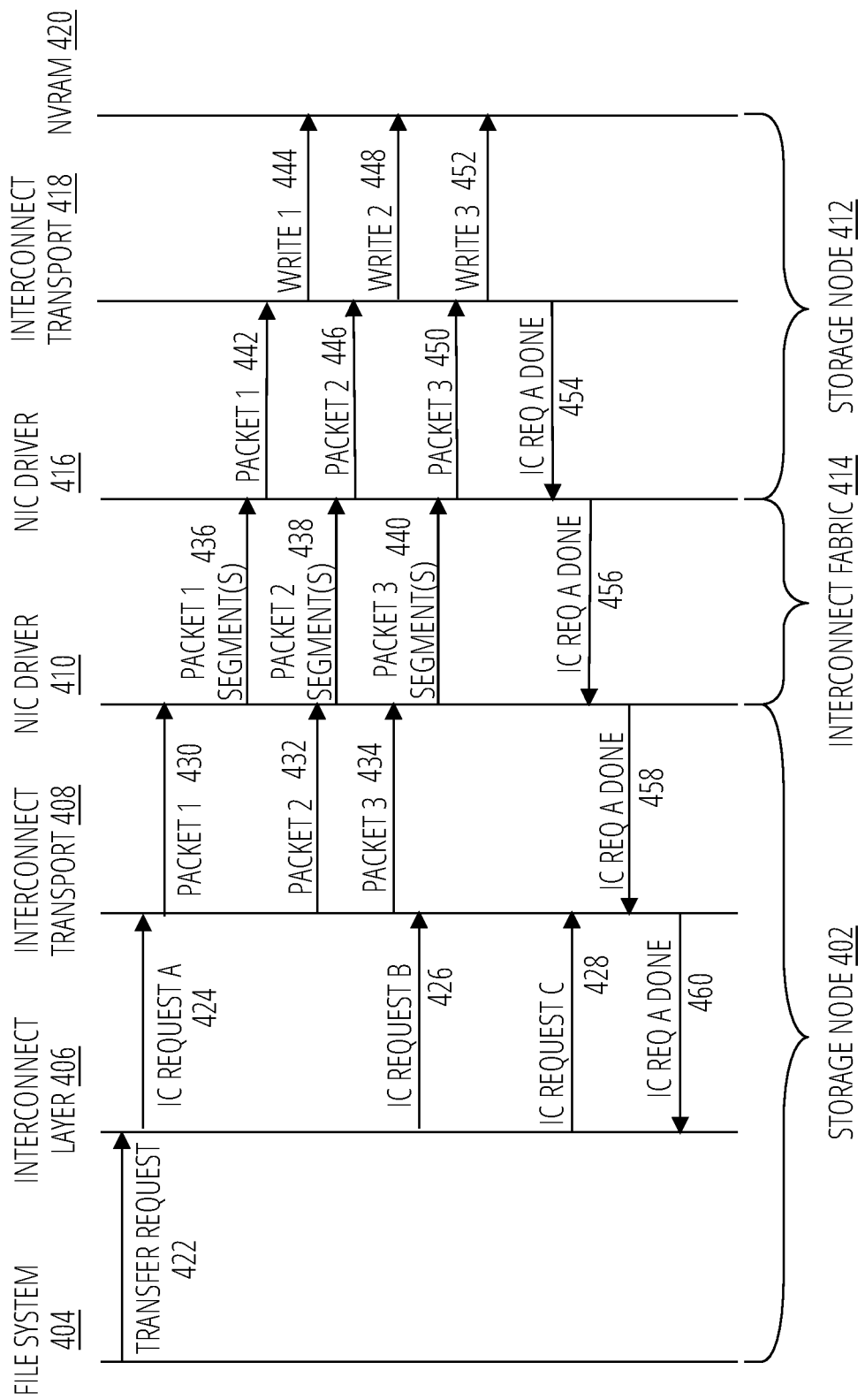
FIG. 4 is an example timing diagram illustrating processing of a transfer request from a first storage node to a second storage node.

FIG. 4 is an example timing diagram illustrating processing of a transfer (e.g., RDMA) request from a first storage node to a second storage node. The example operational flow as illustrated in FIG. 4 can be accomplished utilizing, for example, the architectures of FIG. 1, FIG. 2 and/or FIG. 3. The transfer request can be used to support mirroring of data between storage nodes, for example.

In the example of FIG. 4, storage node 402 includes file system 404, interconnect layer 406, interconnect transport 408 and NIC driver 410. Storage node 402 is coupled with storage node 412 via interconnect fabric 414. Interconnect fabric 414 can be, for example, one or more high-availability interconnect channels, examples of which have been described above. Storage node 412 includes NIC driver 416, interconnect transport 418 and NVRAM 420. The example of FIG. 4 is for transfer request 422 from file system 404 in storage node 402 to cause data to be written to NVRAM 420 in storage node 412. A corresponding set of transactions and elements can also be included in storage node 402 and storage node 412 to allow a file system of storage node 412 (not illustrated in FIG. 4) to cause data to be written to NVRAM in storage node 402 (not illustrated in FIG. 4). In an example, transfer request 422 is a write request, for example, an DRMA request.

File system 404 can generate transfer request 422 to, for example, cause NVLOG data to be mirrored from an NVRAM of storage node 402 to an NVRAM of storage node 412 (e.g., analogous to mirroring of data from NVRAM 132 to NVRAM 136 as illustrated in FIG. 1, or analogous to transfer of data from storage device 340 to storage device 342 as illustrated in FIG. 3). Transfer request 422 can be transmitted from file system 404 to interconnect layer 406.

Interconnect layer 406 can receive transfer request 422 and can generate one or more corresponding interconnect layer requests (e.g., IC request 424, IC request 424, IC request 426). Transfer request 422 can be split into multiple IC layer requests based on, for example, a maximum transfer size supported by interconnect layer 406, interconnect transport 408 and/or interconnect fabric 414.

Individual IC requests can be further subdivided into one or more packets (e.g., IC request 424 can be transmitted over interconnect fabric 414 as packet 430, packet 432 and packet 434). IC request 426 and IC request 428 can be handled in a similar manner by interconnect layer 406. In an example, IC requests are used to generate one or more corresponding Ethernet packets based on the maximum transmission unit (MTU) size and/or data construction characteristics. Additional specifics regarding Ethernet packets can be found in Institute of Electrical and Electronics Engineers (IEEE) Standard 802.3 and related standards.

In some examples, packets can be split into one or more segments (e.g., packet 430 into packet segment(s) 436, packet 432 into packet segment(s) 438, packet 434 into packet segment(s) 440) to be transported over interconnect fabric 414. Storage node 412 reassembles received packet segments into packets (e.g., packet segment(s) 436 into packet 442, packet segment(s) 438 into packet 446, packet segment(s) 440 into packet 450). Data from the received packets is written to a local storage device (e.g., NVRAM 420) on storage node 412 in order.

When an IC request has been completed by writing to a storage device (e.g., NVRAM 420) on storage node 412, one or more acknowledge messages (e.g., IC Req Done 454, IC Req Done 456, IC Req Done 458, IC Req Done 460) are sent back to file system 404 on storage node 402.

As discussed in greater detail below, various approaches can be utilized to manage the flow of data over interconnect fabric 414 to reduce or eliminate spikes that could result in data loss. In one example, a request-based approach can be utilized as described in greater detail with respect to FIG. 5 and FIG. 6. In another example, a packet-based approach can be utilized as described in greater detail with respect to FIG. 7 and FIG. 8. In a further example, a segment-based approach can be utilized as described in greater detail with respect to FIG. 9 and FIG. 10. Example techniques to determine which management approach to apply are provided in FIG. 11 and FIG. 12.

When utilizing the request-based approach, the number of outstanding IC requests is maintained at or below a pre-selected threshold value. Thus, in the request-based approach the number of outstanding IC requests (e.g., IC request 424, IC request 426, IC request 428) is compared to the threshold value, and if the maximum number of outstanding requests has been reached, subsequent IC requests are delayed (e.g., stored in a queue, for example, RDMA engine 216, RDMA engine 326) until one or more outstanding IC requests have been completed.

When utilizing the packet-based approach, the number of outstanding packets is maintained at or below a pre-selected threshold value. Thus, in the packet-based approach the number of outstanding packets on the IC layer (e.g., packet 430, packet 432, packet 434) is compared to the threshold value, and if the maximum number of outstanding packets has been reached, subsequent requests are delayed (e.g., stored in a queue, for example, RDMA engine 216, RDMA engine 326) until the processing of one or more outstanding packets has been completed.

When utilizing the segment-based approach, the number of outstanding segments on interconnect fabric 414 is maintained at or below a pre-selected threshold value. Thus, in the segment-based approach the number of outstanding segments (e.g., segment(s) 436, segment(s) 438, segment(s) 440) is compared to the threshold value and if the maximum number of outstanding segments has been reached, subsequent requests are delayed (e.g., stored in a queue, for example, RDMA engine 216, RDMA engine 326) until the processing of one or more outstanding segments has been completed.

Figure 5:
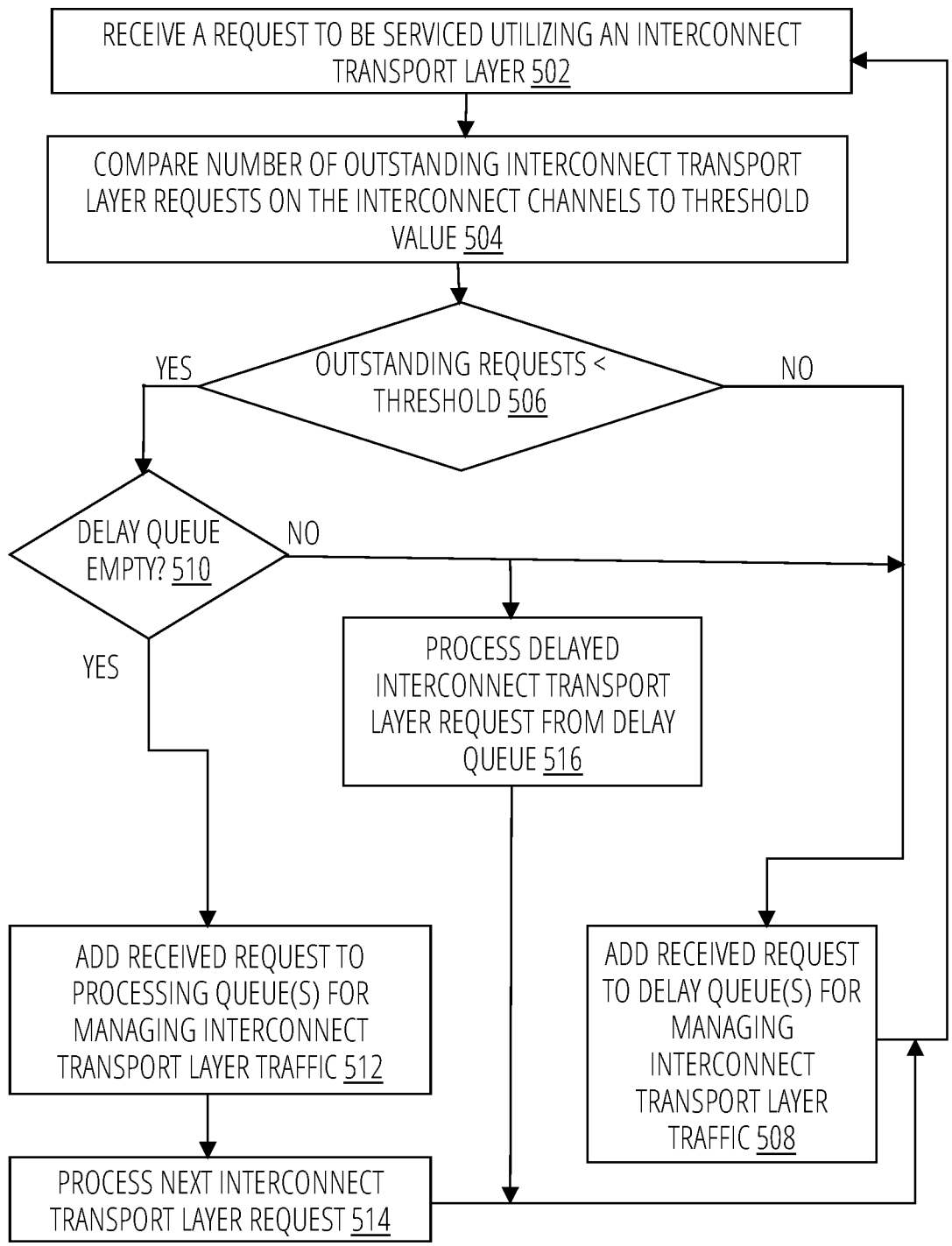
FIG. 5 is a flow diagram for one technique for management of interconnect layer requests based on a number of outstanding requests.

FIG. 5 is a flow diagram for one technique for management of interconnect layer requests based on a number of outstanding requests. The techniques described with respect to FIG. 5 can be applied to the architectures of FIG. 1, FIG. 2 and/or FIG. 3 and can be provided by one or more components of the illustrated storage node architectures.

A request to be serviced utilizing the interconnect transport layer is received, block 502. In an example, the request can be in response to an I/O request received by a storage node (e.g., input/output request(s) 208, input/output request(s) 210, input/output request(s) 308, input/output request(s) 310). In another example, the request can be in response to internal operations within the host storage node. The request can be, for example, in support of mirroring data between NVRAM 336 and NVRAM 338 utilizing RDMA protocols, or direct memory transfers between other storage components.

The number of outstanding interconnect requests on the interconnect channels is compared to a threshold value (e.g., 64, 128, 256), block 504. In the technique described with respect to FIG. 5, traffic on the interconnect channels can be managed based on the number of outstanding requests on the IC channels. That is, the number of requests on the channels (either individually or as a group) are managed so that the number of requests does not spike above a pre-selected value. Elimination (or reduction) of request spikes can prevent dropping of packets and the resulting loss of data and reliability, as data loss undermines HA functionality.

If the number of outstanding requests is not less than the threshold value, decision block 506, then the request is added to a delay queue used for managing traffic on the interconnect transport layer, block 508 (e.g., within RDMA engine 216, file system layer 224, RDMA engine 326 or RDMA engine 334), and processing of the next request is delayed (e.g., by RDMA engine 216, RDMA engine 222, RDMA engine 326, RDMA engine 334).

If the number of outstanding requests is less than the threshold value, decision block 506, and the delay queue is empty, decision block 510, then the request is added to a queue used for managing traffic on the interconnect transport layer (e.g., by RDMA engine 216, RDMA engine 222, RDMA engine 326, RDMA engine 334), block 512, and the next request is processed, block 514 (e.g., by RDMA engine 216, RDMA engine 222, RDMA engine 326, RDMA engine 334).

If the number of outstanding requests is less than the threshold value, decision block 506, and the delay queue is not empty, decision block 510, then the new request is added to the delay queue, block 508, and a previously delayed request is processed from the delay queue, block 516. Processing delayed requests before new requests keeps the request processing in order.

The threshold value to be used can be based on various factors including, for example, number of channels, channel capacity, number of interconnected peer nodes, transport layer packet size, etc. Further, the threshold value can be determined based on automated analysis of the interconnect transport layer using, for example, artificial intelligence (AI)/machine learning (ML) techniques and/or the threshold value can be based on user (e.g., system administrator) input. Various queue structures can be supported. For example, one transmit queue can be maintained for each channel, or multiple transmit queues can be maintained for each channel.

When a request has been processed and a Done message has been received (e.g., as illustrated in FIG. 4), the number of outstanding interconnect transport requests is decreased accordingly. In an example, this is accomplished by an independent process that operates asynchronously. In other examples, a different approach can be used to decrease the count of outstanding interconnect requests.

Figure 6:
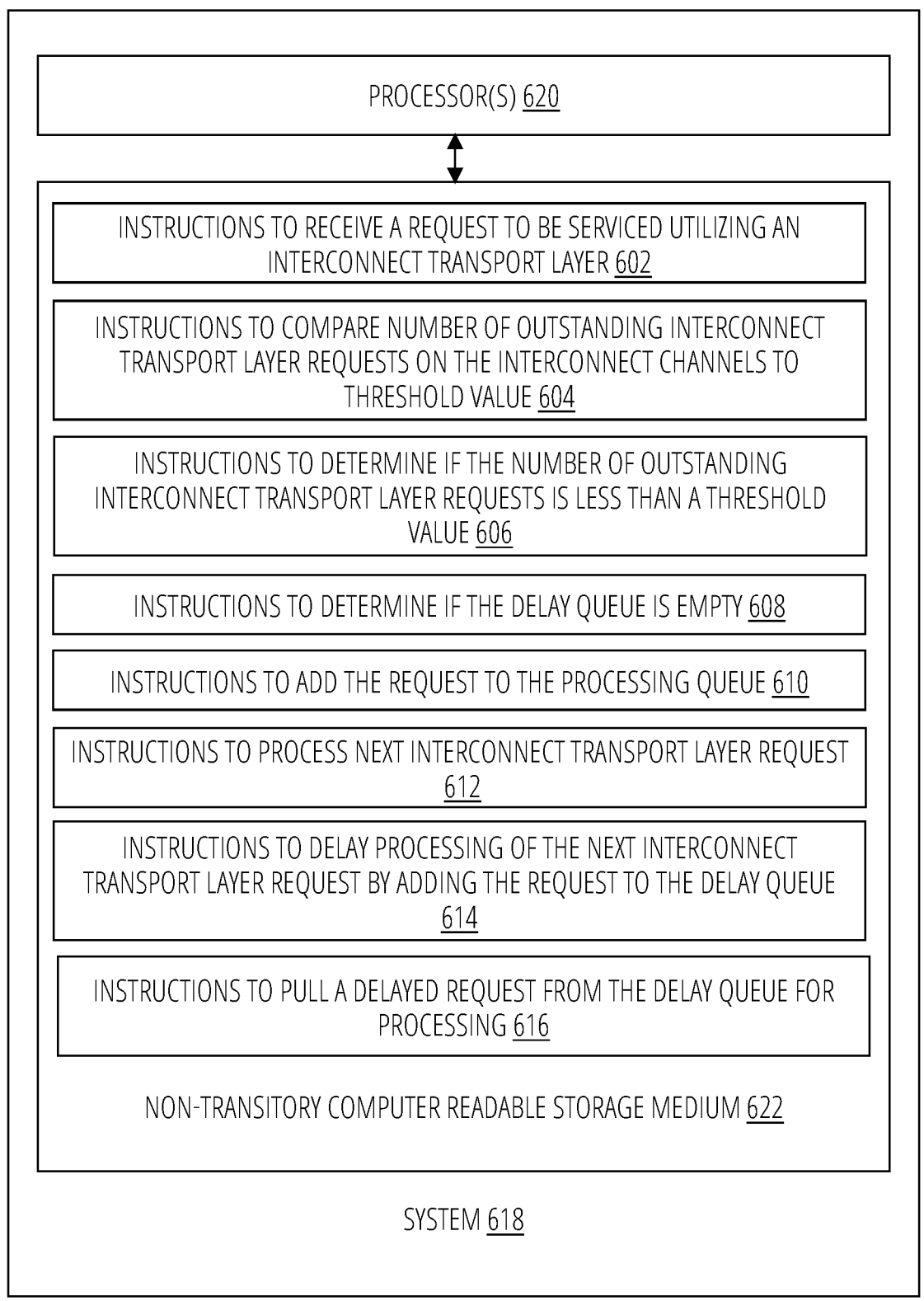
FIG. 6 is a block diagram of one example of a processing system that can provide management of interconnect layer requests based on a number of outstanding requests.

FIG. 6 is a block diagram of one example of a processing system that can provide management of interconnect layer requests based on a number of outstanding requests. In an example, system 618 can include processor(s) 620 and non-transitory computer readable storage medium 622. In an example, processor(s) 620 and non-transitory computer readable storage medium 622 can be part of a storage node management agent (e.g., management agent 108, management agent 112) and/or storage system controller (e.g., storage system controller 106, storage system controller 110) that can provide some or all of the functionality of the ONTAP software as mentioned above.

Non-transitory computer readable storage medium 622 may store instructions 602, 604, 606, 608, 612, 614 and 616 that, when executed by processor(s) 620, cause processor(s) 620 to perform various functions. Examples of processor(s) 620 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of a non-transitory computer readable storage medium 622 include tangible media such as random-access memory (RAM), read-only memory (ROM), electrically erasable programmable read-only memory (EEPROM), flash memory, a hard disk drive, etc.

Instructions 602 cause processor(s) 620 to receive a request to be serviced utilizing the interconnect transport layer. In an example, the request can be in response to an I/O request received by a storage node (e.g., input/output request(s) 208, input/output request(s) 210, input/output request(s) 308, input/output request(s) 310). In another example, the request can be in response to internal operations within the host storage node. The request can be, for example, in support of mirroring data between NVRAM 336 and NVRAM 338 utilizing RDMA protocols.

Instructions 604 cause processor(s) 620 to compare the number of outstanding interconnect requests on the interconnect channels a threshold value. In the approach described with respect to FIG. 6, traffic on the interconnect channels can be managed based on the number of outstanding requests on the channels (e.g., by RDMA engine 216, RDMA engine 222, RDMA engine 326, RDMA engine 334). Thus, the number of requests on the channels (either individually or as a group) are managed so that the number of requests does not spike above a pre-selected value.

Instructions 606 cause processor(s) 620 to compare the number of outstanding interconnect transport layer requests on the interconnect channels to a threshold value. The threshold value to be used can be based on various factors including, for example, number of channels, channel capacity, number of interconnected peer nodes, transport layer packet size, etc. In an example, the threshold value can be determined based on automated analysis of the interconnect transport layer using, for example, AI/ML techniques and/or the threshold value can be based on user (e.g., system administrator) input.

Instructions 608 cause processor(s) 620 to determine if the delay queue is empty. In an example, the delay queue(s) and/or the processing queue(s) can be part of or managed by an RDMA engine (e.g., RDMA engine 216, RDMA engine 222, RDMA engine 326, RDMA engine 334).

Instructions 610 cause processor(s) 620 to add the request a processing queue used for managing traffic on the interconnect transport layer if the number of outstanding requests is less than the threshold value and the delay queue is empty. Various queue structures can be supported (e.g., RDMA engine 216, RDMA engine 326). For example, one processing queue can be maintained for each channel, or multiple transmit queues can be maintained for each channel. Instructions 612 cause processor(s) 620 to process the next request from the processing queue if the number of outstanding requests is less than the threshold value.

Instructions 614 cause processor(s) 620 to delay processing of the next request if the number of outstanding requests is not less than the threshold value by adding the received request to the delay queue. Instructions 616 cause processor(s) 620 to pull a delayed request from the delay queue for processing if the number of requests exceed the threshold, or if the number of requests is less than the threshold and the delay queue is not empty. The pulled delay request can be processed by, for example, instructions 612 executed by processor(s) 620.

Figure 7:
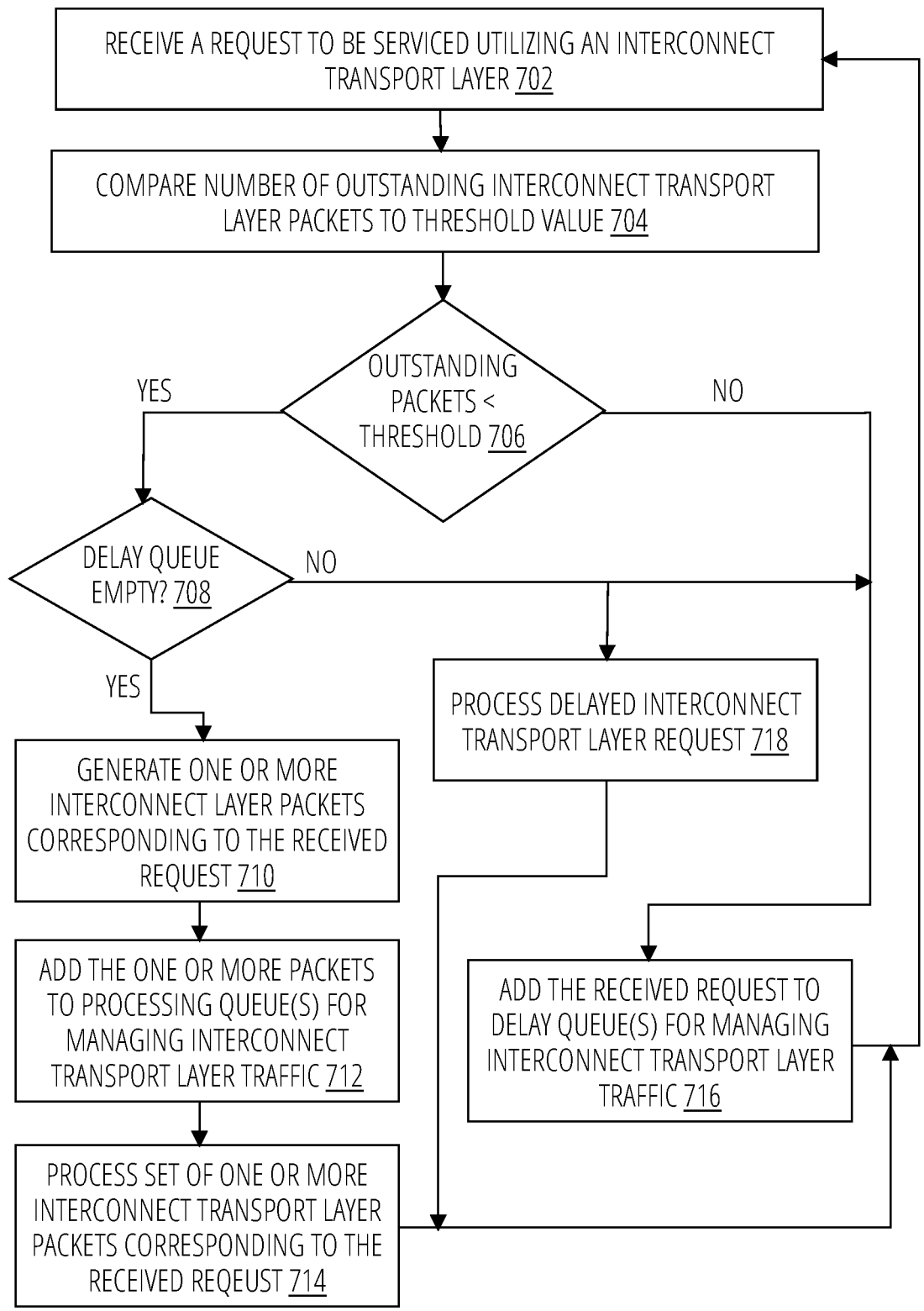
FIG. 7 is a flow diagram for one technique for management of interconnect layer requests based on a number of outstanding interconnect packets.

FIG. 7 is a flow diagram for one technique for management of interconnect layer requests based on a number of outstanding interconnect packets. The techniques described with respect to FIG. 7 can be applied to the architectures of FIG. 1, FIG. 2 and/or FIG. 3 and can be provided by one or more components of the illustrated storage node architectures.

A request to be serviced utilizing the interconnect transport layer is received, block 702. In an example, the request can be in response to an I/O request received by a storage node (e.g., input/output request(s) 208, input/output request(s) 210, input/output request(s) 308, input/output request(s) 310). In another example, the request can be in response to internal operations within the host storage node. The request can be, for example, in support of mirroring data between NVRAM 336 and NVRAM 338 utilizing RDMA protocols.

The number of outstanding transport layer packets (e.g., UDP packets) is compared to a threshold value (e.g., 128, 256, 328, 500), block 704. The threshold value to be used can be based on various factors including, for example, number of channels, channel capacity, number of interconnected peer nodes, transport layer packet size, etc. In an example, the threshold value can be determined based on automated analysis of the interconnect transport layer using, for example, AI/ML techniques and/or the threshold value can be based on user (e.g., system administrator) input.

In an example, User Datagram Protocol (UDP) is used on the transport layer for transporting data between source and destination nodes (e.g., storage node 102 and storage node 104, storage node 202 and storage node 204, storage node 304 and storage node 306). In general, UDP works by encapsulating data into packets and providing header information to the packet. In an example, UDP is utilized for data transmission over the high-availability interconnect channels (e.g., high-availability interconnect channels 218, HAIC channel 312, HAIC channel 314, HAIC channel 316, HAIC channel 318).

UDP is part of the Internet Protocol (IP) suite of protocols and is an unreliable and connectionless protocol. The UDP protocol permits packets to be dropped rather than providing a protocol-based delay mechanism. Further, there is no error checking in UDP, which can reduce bandwidth requirements. Each UDP segment is handled independently of other segments as each segment can take a different path to reach the destination. Thus, UDP segments can be lost or delivered out of order because there is no protocol-based connection setup between the sender and the receiver. Overall, UDP is more efficient in terms of both latency and bandwidth as compared to Transmission Control Protocol (TCP), which is a connection-oriented protocol.

A UDP header is 8 bytes and includes a 2-byte source port number, a 2-byte destination port number, a 2-byte length field and a 2-byte checksum. More specifics about the UDP protocol can be found in Request for Comments (RFC) 768 of the Internet Engineering Task Force (IETF). While specific examples provided herein are based on UDP-based communications over the high-availability interconnect channels, other communications protocols can also be supported and utilized with the management approaches described herein. In an example, the packets are Ethernet packets and are generated based on request size, payload size, maximum transmission unit (MTU) size and/or data construction characteristics.

If the number of outstanding packets is less than the threshold value, decision block 706 and the delay queue is empty, decision block 708, then one or more interconnect transport layer packets is generated based on the received request, block 710. After the packets are generated, the number of outstanding packets can be increased by the number of packets generated. In an example, after the packet threshold evaluation in decision block 706 the number of outstanding packets can exceed the threshold value. Thus, the packets can be generated after an evaluation of the available bandwidth for transmitting the newly created packets.

The one or more packets are added to a processing queue used for managing traffic on the interconnect transport layer (e.g., in RDMA engine 216, RDMA engine 222, RDMA engine 326, RDMA engine 334) for managing traffic on the interconnect transport layer, block 712, and the next packet is processed, block 714 (e.g., by RDMA engine 216, RDMA engine 222, RDMA engine 326, RDMA engine 334). In an example, after processing of packets corresponding to a request at block 714, the number of outstanding packets on the interconnect layer can exceed the threshold value.

If the number of outstanding packets is less than the threshold value, decision block 706 and the delay queue is not empty, decision block 708, then a delayed request is processed, block 718. Processing packets for a delayed request before packets for a new request keeps the request processing in order. In an example, packets are not generated until the request becomes active either by passing a threshold check (e.g., decision block 706) or by being pulled from the delay queue (e.g., block 718).

If the number of outstanding packets is not less than the threshold value, decision block 706, then received request is added to a delay queue used for managing traffic on the interconnect transport layer (e.g., RDMA engine 216, RDMA engine 222, RDMA engine 326, RDMA engine 334) for managing traffic on the interconnect transport layer, block 716, and then processing of the next packet is delayed (e.g., by RDMA engine 216, RDMA engine 222, RDMA engine 326, RDMA engine 334).

When one or more packets have been processed and a Done message has been received (e.g., as illustrated in FIG. 4), the number of outstanding interconnect transport layer packets is decreased accordingly. In an example, this is accomplished by an independent process that operates asynchronously. In other examples, a different approach can be used to decrease the count of outstanding interconnect layer packets.

Figure 8:
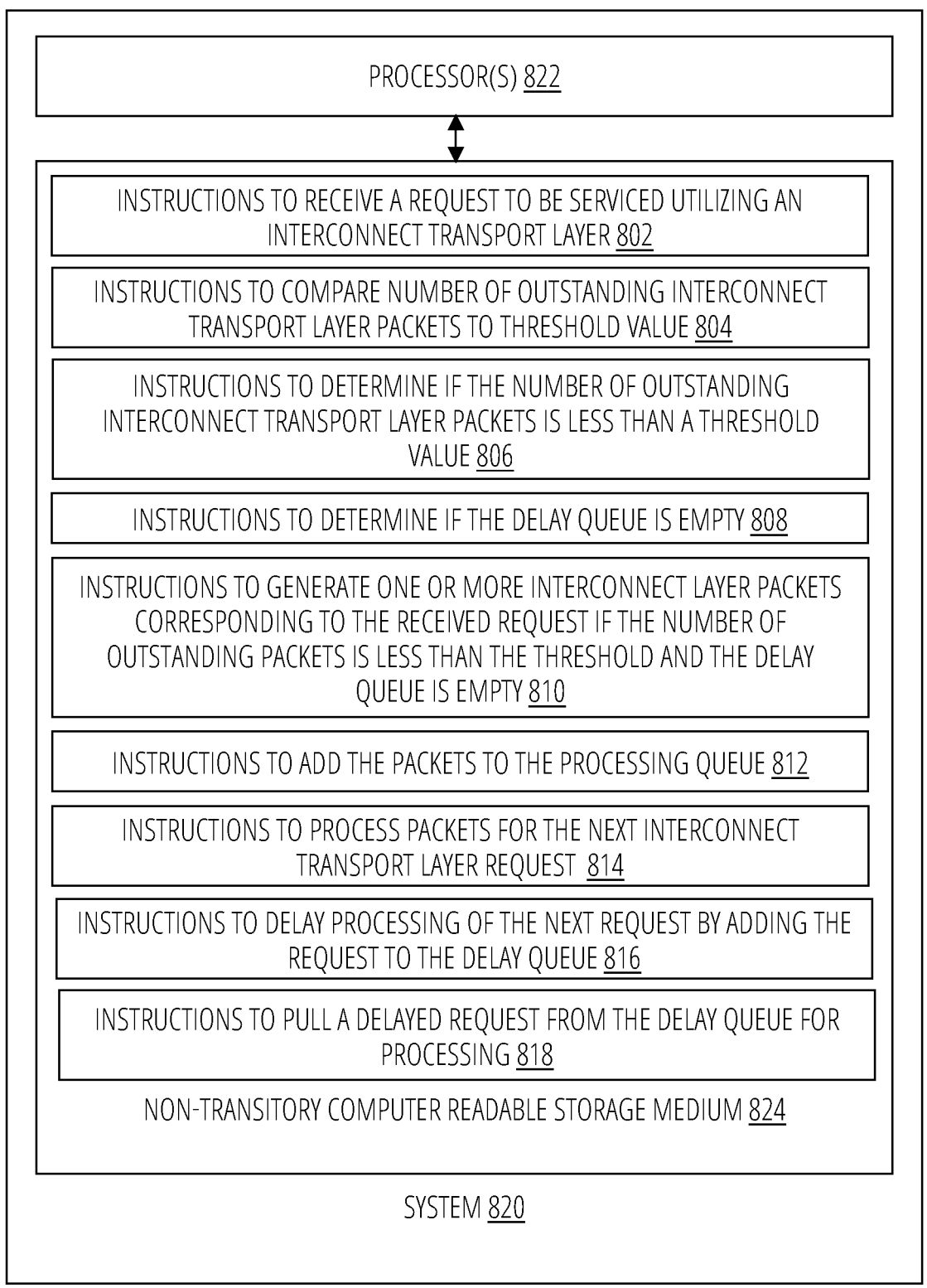
FIG. 8 is a block diagram of one example of a processing system that can provide management of interconnect layer requests based on a number of outstanding interconnect packets.

FIG. 8 is a block diagram of one example of a processing system that can provide management of interconnect layer requests based on a number of outstanding interconnect packets. In an example, system 820 can include processor(s) 822 and non-transitory computer readable storage medium 824. In an example, processor(s) 822 and non-transitory computer readable storage medium 824 can be part of a storage node management agent (e.g., management agent 108, management agent 112) and/or storage system controller (e.g., storage system controller 106, storage system controller 110) that can provide some or all of the functionality of the ONTAP software as mentioned above.

Non-transitory computer readable storage medium 824 may store instructions 802, 804, 806, 808, 810, 812 and 814 that, when executed by processor(s) 822, cause processor(s) 822 to perform various functions. Examples of processor(s) 822 may include a microcontroller, a microprocessor, a CPU, a GPU, a DPU, an ASIC, an FPGA, a SoC, etc. Examples of a non-transitory computer readable storage medium 824 include tangible media such as RAM, ROM, EEPROM, flash memory, a hard disk drive, etc.

Instructions 802 cause processor(s) 822 to receive a request to be serviced utilizing the interconnect transport layer. In an example, the request can be in response to an I/O request received by a storage node (e.g., input/output request(s) 208, input/output request(s) 210, input/output request(s) 308, input/output request(s) 310). In another example, the request can be in response to internal operations within the host storage node. The request can be, for example, in support of mirroring data between NVRAM 336 and NVRAM 338 utilizing RDMA protocols.

As discussed above, UDP is used on the transport layer for transporting data between source and destination nodes. While specific examples provided herein are based on UDP-based communications over the high-availability interconnect channels, other communications protocols can also be supported and utilized with the management approaches described herein.

Instructions 804 cause processor(s) 822 to compare the number of outstanding transport layer packets (e.g., UDP packets) to a threshold value. The threshold value to be used can be based on various factors including, for example, number of channels, channel capacity, number of interconnected peer nodes, transport layer packet size, etc. In an example, the threshold value can be determined based on automated analysis of the interconnect transport layer using, for example, AI/ML techniques and/or the threshold value can be based on user (e.g., system administrator) input.

Instructions 806 cause processor(s) 822 to determine if the number of outstanding interconnect transport layer packets is less than a threshold value. Instructions 808 cause processor(s) 822 to determine if the delay queue is empty. In an example, the delay queue(s) and/or the processing queue(s) can be part of or managed by an RDMA engine (e.g., RDMA engine 216, RDMA engine 222, RDMA engine 326, RDMA engine 334).

Instructions 810 cause processor(s) 822 to generate one or more interconnect transport layer packets (e.g., Ethernet packets) based on the received request if the number of outstanding packets is less than the threshold and the delay queue is empty. Different requests can have different sizes so the number of packets generated by a small IC request may be significantly different than the number of packets generated by a large IC request. These differences can result in performance decreases in terms of reduced throughput.

Instructions 812 cause processor(s) 822 to add the one or more packets to one or more processing queues (e.g., in RDMA engine 216, RDMA engine 222, RDMA engine 326, RDMA engine 334) used for managing traffic on the interconnect transport layer. Various queue structures can be supported. Instructions 814 cause processor(s) 822 to process the packets for the next request when the number of outstanding packets is less than the threshold value and the delay queue is empty.

Instructions 816 cause processor(s)s 822 delay processing of the next packet if the number of outstanding packets is not less than the threshold value and the delay queue is not empty by adding the request to the delay queue.

Instructions 818 cause processor(s) 822 to pull a delayed request from the delay queue for processing if the number of requests exceed the threshold, or if the number of requests is less than the threshold and the delay queue is not empty. The pulled delay request can be processed by, for example, instructions 814 executed by processor(s) 822. In an example, packets are not generated until the request becomes active either by passing a threshold check (e.g., instructions 806) or by being pulled from the delay queue (e.g., instructions 818).

Figure 9:
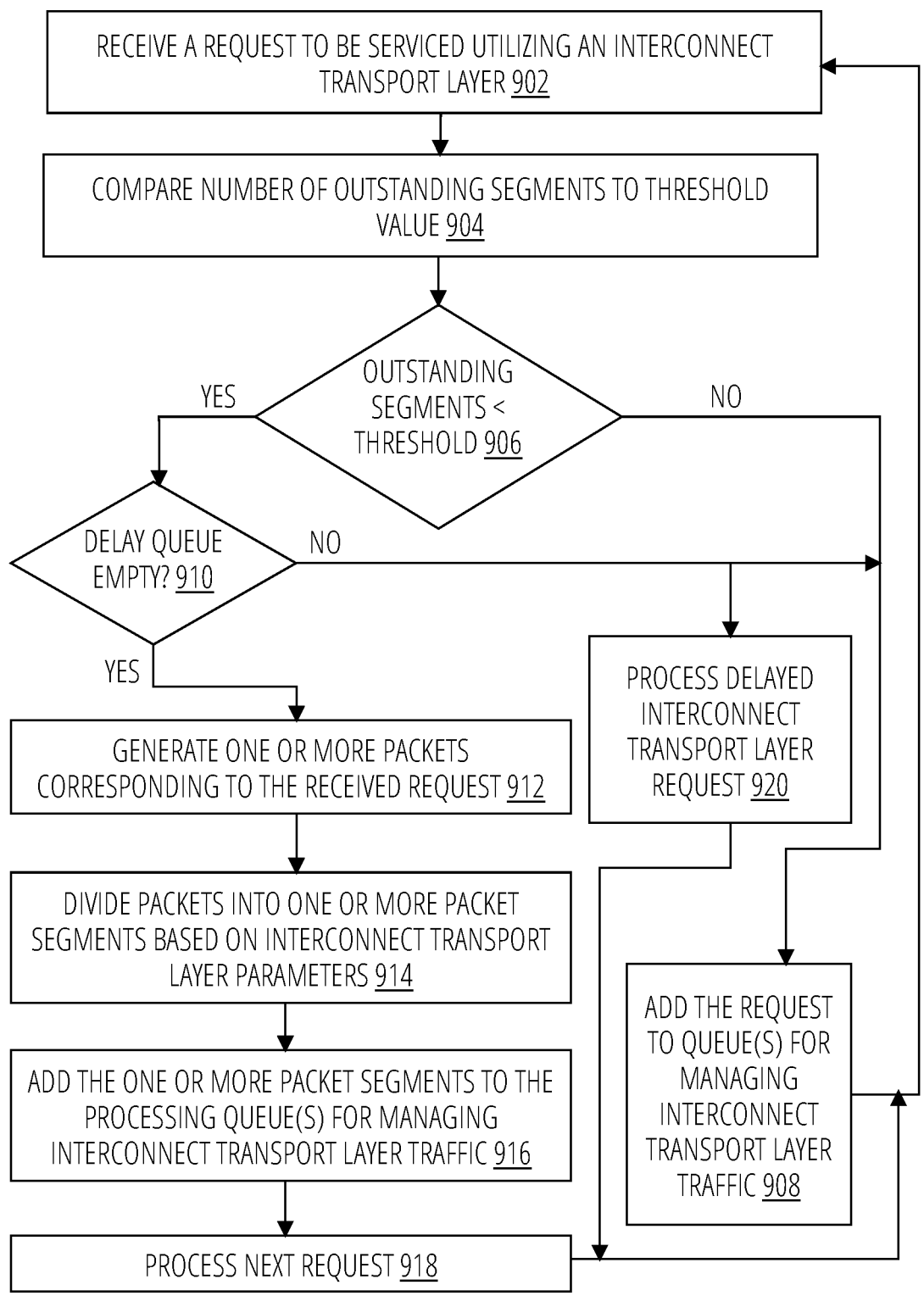
FIG. 9 is a flow diagram for one technique for management of interconnect layer requests based on a number of outstanding interconnect packet segments.

FIG. 9 is a flow diagram for one technique for management of interconnect layer requests based on a number of outstanding interconnect packet segments. The techniques described with respect to FIG. 9 can be applied to the architectures of FIG. 1, FIG. 2 and/or FIG. 3 and can be provided by one or more components of the illustrated storage node architectures.

A request to be serviced utilizing the interconnect transport layer is received, block 902. In an example, the request can be in response to an I/O request received by a storage node (e.g., input/output request(s) 208, input/output request(s) 210, input/output request(s) 308, input/output request(s) 310). In another example, the request can be in response to internal operations within the host storage node. The request can be, for example, in support of mirroring data between NVRAM 336 and NVRAM 338 utilizing RDMA protocols.

The number of outstanding transport layer packet segments (e.g., UDP packets) is compared to a threshold value, block 904. The threshold value to be used can be based on various factors including, for example, number of channels, channel capacity, number of interconnected peer nodes, transport layer packet size, etc. In an example, the threshold value can be determined based on automated analysis of the interconnect transport layer using, for example, AI/ML techniques and/or the threshold value can be based on user (e.g., system administrator) input.

In an example, UDP is used on the transport layer for transporting data between source and destination nodes (e.g., storage node 102 and storage node 104, storage node 202 and storage node 204, storage node 304 and storage node 306) over the high-availability interconnect channels (e.g., high-availability interconnect channels 218, HAIC channel 312, HAIC channel 314, HAIC channel 316, HAIC channel 318).

If the number of outstanding packets is less than the threshold value, decision block 906 and the delay queue is empty, decision block 910, then one or more interconnect transport layer packets are generated based on the received request, block 912 and the packets can be divided into one or more packet segments, block 914. After the packet segments are generated, the number of outstanding packet segments can be increased by the number of packet segments generated. In an example, after the packet segment threshold evaluation in decision block 906 the number of outstanding packet segments can exceed the threshold value. Thus, the packet segments can be generated after an evaluation of the available bandwidth for transmitting the newly created packet segments.

The one or more packet segments are added to a processing queue used for managing traffic on the interconnect transport layer (e.g., in RDMA engine 216, RDMA engine 222, RDMA engine 326, RDMA engine 334) for managing traffic on the interconnect transport layer, block 916, and the segments for the received packet are processed, block 918 (e.g., by RDMA engine 216, RDMA engine 222, RDMA engine 326, RDMA engine 334). In an example, after processing of packets corresponding to a request at block 918, the number of outstanding packets on the interconnect layer can exceed the threshold value. In an example, packet segments are not generated until the request becomes active either by passing a threshold check (e.g., decision block 906) or by being pulled from the delay queue (e.g., block 920).

If the number of outstanding packets is less than the threshold value, decision block 906 and the delay queue is not empty, block 908, then a delayed request is processed, block 920. Processing packets for a delayed request before packets for a new request keeps the request processing in order.

If the number of outstanding packets is not less than the threshold value, decision block 906, then received request is added to a delay queue used for managing traffic on the interconnect transport layer (e.g., RDMA engine 216, RDMA engine 222, RDMA engine 326, RDMA engine 334) for managing traffic on the interconnect transport layer, block 908, and then processing of the next packet is delayed (e.g., by RDMA engine 216, RDMA engine 222, RDMA engine 326, RDMA engine 334).

When one or more packets have been processed and a Done message has been received (e.g., as illustrated in FIG. 4), the number of outstanding interconnect transport layer packet segments is decreased accordingly. In an example, this is accomplished by an independent process that operates asynchronously. In other examples, a different approach can be used to decrease the count of outstanding interconnect layer packet segments.

Figure 10:
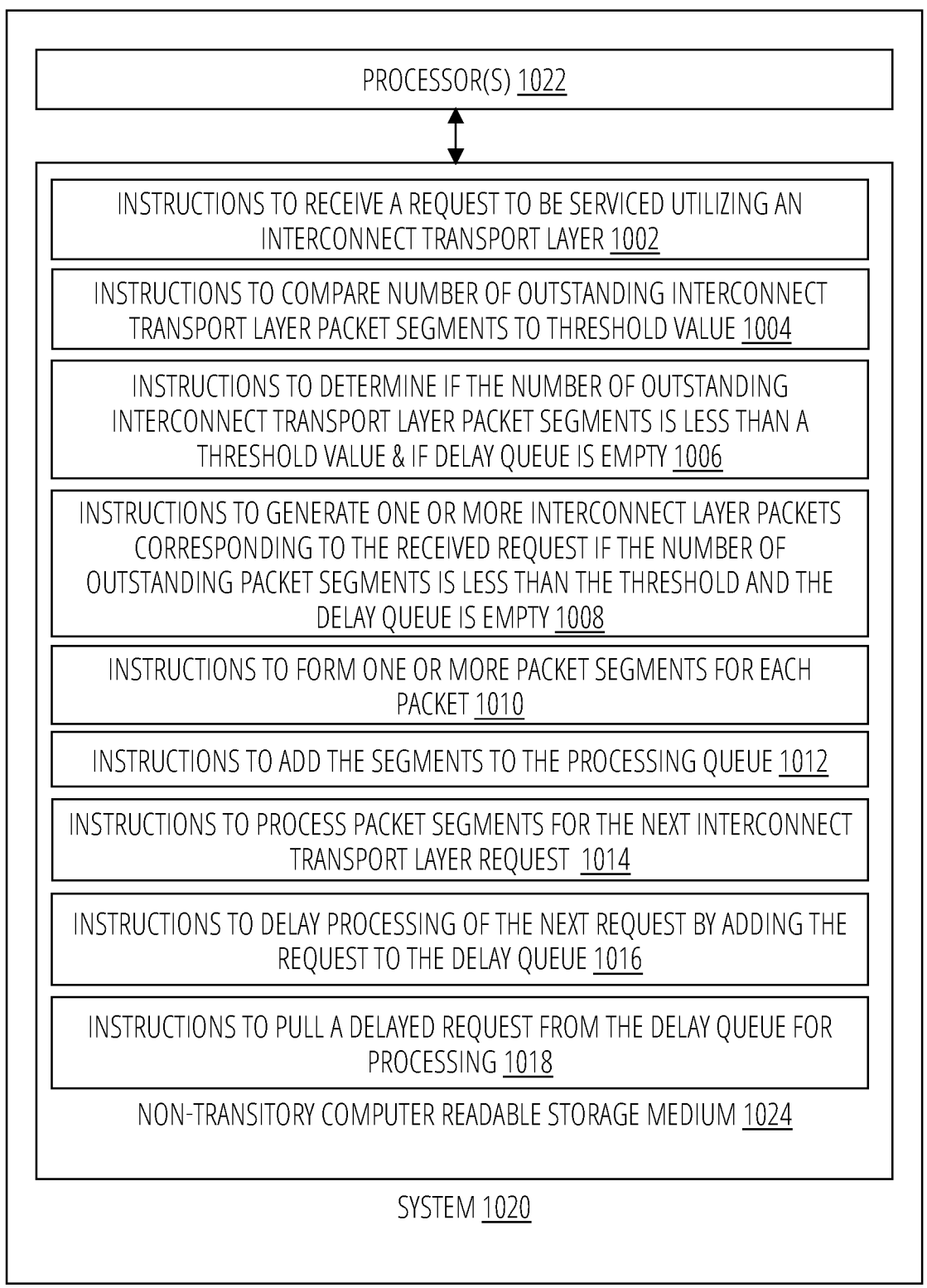
FIG. 10 is a block diagram of one example of a processing system that can provide management of interconnect layer requests based on a number of outstanding interconnect packet segments.

FIG. 10 is a block diagram of one example of a processing system that can provide management of interconnect layer requests based on a number of outstanding interconnect packet segments. In an example, system 1020 can include processor(s) 1022 and non-transitory computer readable storage medium 1024. In an example, processor(s) 1022 and non-transitory computer readable storage medium 1024 can be part of a storage node management agent (e.g., management agent 108, management agent 112) and/or storage system controller (e.g., storage system controller 106, storage system controller 110) that can provide some or all of the functionality of the ONTAP software as mentioned above.

Non-transitory computer readable storage medium 1024 may store instructions 1002, 1004, 1006, 1008, 1010, 1012, 1014, 1016 and 1018 that, when executed by processor(s) 1022, cause processor(s) 1022 to perform various functions. Examples of processor(s) 1022 may include a microcontroller, a microprocessor, a CPU, a GPU, a DPU, an ASIC, an FPGA, a SoC, etc. Examples of a non-transitory computer readable storage medium 1024 include tangible media such as RAM, ROM, EEPROM, flash memory, a hard disk drive, etc.

Instructions 1002 cause processor(s) 1022 to receive a request to be serviced utilizing the interconnect transport layer. In an example, the request can be in response to an I/O request received by a storage node (e.g., input/output request(s) 208, input/output request(s) 210, input/output request(s) 308, input/output request(s) 310). In another example, the request can be in response to internal operations within the host storage node. The request can be, for example, in support of mirroring data between NVRAM 336 and NVRAM 338 utilizing RDMA protocols.

Instructions 1004 cause processor(s) 1022 to compare the number of outstanding transport layer packet segments to a threshold value. The threshold value to be used can be based on various factors including, for example, number of channels, channel capacity, number of interconnected peer nodes, transport layer packet size, etc. In an example, the threshold value can be determined based on automated analysis of the interconnect transport layer using, for example, AI/ML techniques and/or the threshold value can be based on user (e.g., system administrator) input.

Instructions 1006 cause processor(s) 1022 to determine if the number of outstanding interconnect transport layer packet segments is less than a threshold value and determine if the delay queue is empty. In an example, the delay queue(s) and/or the processing queue(s) can be part of or managed by an RDMA engine (e.g., RDMA engine 216, RDMA engine 222, RDMA engine 326, RDMA engine 334).

Instructions 1008 cause processor(s) 1020 to generate one or more interconnect transport layer packets based on the received request. As discussed above, UDP is used on the transport layer for transporting data between source and destination nodes. While specific examples provided herein are based on UDP-based communications over the high-availability interconnect channels, other communications protocols can also be supported and utilized with the management approaches described herein.

Instructions 1010 cause processor(s) 1020 to separate UDP packets in to one or more packet segments for each packet. Packet segment creation can be based on various factors including, for example, packet sizes, data alignment, other interconnect layer parameters/characteristics and/or interconnect fabric parameters/characteristics. Header and payload data for each packet can be stored in different memory segments. For larger frames, multiple memory pages may be needed to store the data. Because each memory segment does not cross page boundaries for DMA purposes, each packet can contain multiple memory segments.

Instructions 1012 cause processor(s) 1022 to add the one or more packet segments to the processing queue (e.g., RDMA engine 216, RDMA engine 222, RDMA engine 326, RDMA engine 334). Various queue structures can be supported (e.g., RDMA engine 216, RDMA engine 326). Instructions 1014 cause processor(s) 1022 to process the packet segments for the next request when the number of outstanding packet segments is less than the threshold value and the delay queue is empty.

Instructions 1016 cause processor(s) 1022 delay processing of the next packet if the number of outstanding packets is not less than the threshold value and the delay queue is not empty by adding the request to the delay queue.

Instructions 1018 cause processor(s) 1022 to pull a delayed request from the delay queue for processing if the number of requests exceed the threshold, or if the number of requests is less than the threshold and the delay queue is not empty. The pulled delay request can be processed by, for example, instructions 1008 executed by processor(s) 1022. In an example, packets are not generated until the request becomes active either by passing a threshold check (e.g., instructions 1006) or by being pulled from the delay queue (e.g., instructions 1018).

Figure 11:
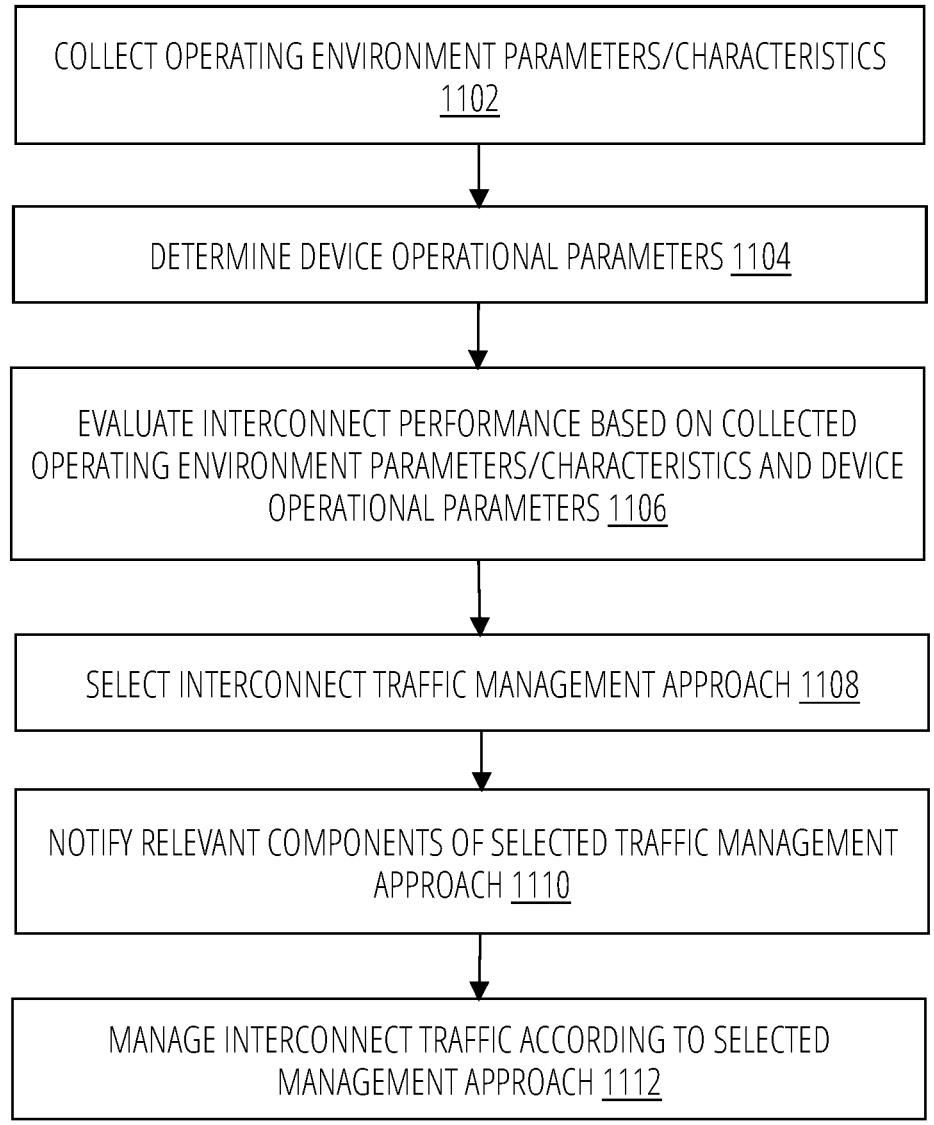
FIG. 11 is a flow diagram for one technique for selecting an interconnect layer traffic management approach to use.

FIG. 11 is a flow diagram for one technique for selecting an interconnect layer traffic management approach to use. The selection of which type of traffic management approach to use (e.g., the request-based approach, the packet-based approach, the segment-based approach) can be performed statically or dynamically. The techniques of FIG. 11 can be statically or dynamically applied.

In general, the determination of which traffic management approach to use can be based on one or more of the request (e.g., RDMA request 422) size, IC fabric throughput for a specified request size, number of packets for a specific request size, the maximum number of requests that can be managed by the IC fabric and infrastructure, etc. Additional and/or different characteristics can be utilized. Some or all of these characteristics may vary on the host environment. For example, when operating in a cloud-based environment, one or more of the relevant characteristics may be dependent on the host environment. One cloud environment may support a larger MTU than another cloud environment, which may impact optimal traffic management parameters on an interconnect fabric supporting RDMA functionality within the environment.

Operating environment parameters and/or characteristics are collected, block 1102. Example operating environment parameters include, for example, a cloud provider, MTU size, number of channels, operating speeds of one or more components, number of connected storage nodes, cluster configurations, I/O request size, etc. Additional and/or different operating environment parameters/characteristics can also be utilized.

Operational parameters for one more devices are determined, block 1104. Example operational parameters include, for example, memory size and/or configuration, memory type, available storage devices, storage device type, channel width, channel speed, queue sizes, NIC specifications, etc. Additional and/or different operational parameters can also be utilized.

Performance of the interconnect (e.g., one or more of interconnect channels, connection queues, interconnect transport layer, interconnect layer) is evaluated based on the collected operating environment parameters/characteristics and the device operational parameters, block 1106. In an example, performance is evaluated for RDMA operations under different conditions (e.g., 4 channels vs. 8 channels).

In an example, performance is evaluated for different traffic management approaches (e.g., request-based management, packet-based management, segment-based management). Performance of the interconnect can be considered in terms of, for example, interconnect transport layer throughput; however, other performance evaluations can be utilized.

A traffic management approach is selected based on the evaluation, block 1108. In an example, one of a request-based approach (e.g., as discussed in FIG. 5 and FIG. 6), a packet-based approach (e.g., FIG. 7 and FIG. 8) or a segment-based approach (e.g., FIG. 9 and FIG. 10) can be selected. In another example, a byte-based approach can also be supported.

Management and control components (e.g., management agent 108, storage system controller 106, interconnect layer 214, interconnect transport layer 324) that operate according to the selected traffic management approach are notified, block 1110. The notification can be provided via, for example, management messaging channels and protocols.

In response to the notification, traffic over the interconnect is managed according to the selected traffic management approach, block 1112. The technique of FIG. 11 can be periodically repeated to provide dynamically adjusted traffic management over the interconnect.

Figure 12:
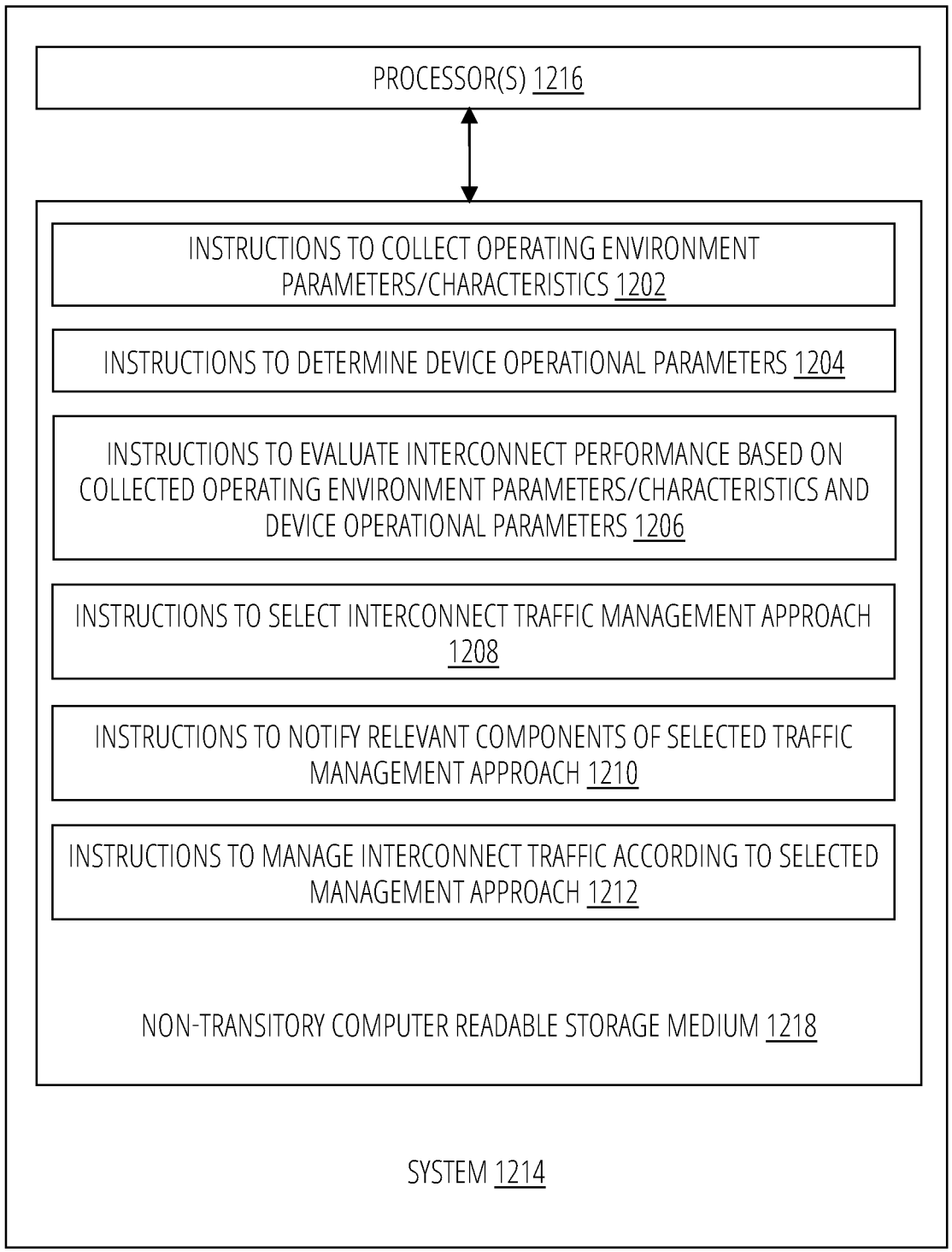
FIG. 12 is a block diagram of one example of a processing system that can provide selection of an interconnect layer traffic management approach to use.

FIG. 12 is a block diagram of one example of a processing system that can provide selection of an interconnect layer traffic management approach to use. In an example, system 1214 can include processor(s) 1216 and non-transitory computer readable storage medium 1218. In an example, processor(s) 1216 and non-transitory computer readable storage medium 1218 are part of a storage node management agent (e.g., management agent 108, management agent 112) and/or storage system controller (e.g., storage system controller 106, storage system controller 110) that can provide some or all of the functionality of the ONTAP software as mentioned above. As another example, processor(s) 1216 and non-transitory computer readable storage medium 1218 can be part of a cluster controller/management agent or could otherwise be external to the storage nodes being managed.

Non-transitory computer readable storage medium 1218 may store instructions 1202, 1204, 1206, 1208, 1210 and 1212 that, when executed by processor(s) 1216, cause processor(s) 1216 to perform various functions. Examples of processor(s) 1216 may include a microcontroller, a microprocessor, a CPU, a GPU, a DPU, an ASIC, an FPGA, a SoC, etc. Examples of a non-transitory computer readable storage medium 1218 include tangible media such as RAM, ROM, EEPROM, flash memory, a hard disk drive, etc.

Instructions 1202 cause processor(s) 1216 to collect operating environment parameters and/or characteristics. Example operating environment parameters include, for example, a could provider, MTU size, number of channels, operating speeds of one or more components, number of connected storage nodes, cluster configurations, etc. Additional and/or different operating environment parameters/characteristics can also be utilized.

Instructions 1204 cause processor(s) 1216 to determine device operational parameters for one or more devices in the operating environment. Example operational parameters include, for example, memory size and/or configuration, memory type, channel width, queue sizes, etc. Additional and/or different operational parameters can also be utilized.

Instructions 1206 cause processor(s) 1216 to evaluate performance of the interconnect (e.g., one or more of interconnect channels, connection queues, interconnect transport layer, interconnect layer) is evaluated based on the collected operating environment parameters/characteristics and the device operational parameters. In an example, performance is evaluated for RDMA operations under different conditions (e.g., 4 channels vs. 8 channels). In an example, performance is evaluated for different traffic management approaches (e.g., request-based management, packet-based management, segment-based management).

Performance of the interconnect can be considered in terms of, for example, interconnect transport layer throughput; however, other performance evaluations can be utilized.

Instructions 1208 cause processor(s) 1216 to select an interconnect traffic management approach based on the evaluation. In an example, one of a request-based approach (e.g., as discussed in FIG. 5 and FIG. 6), a packet-based approach (e.g., FIG. 7 and FIG. 8) or a segment-based approach (e.g., FIG. 9 and FIG. 10) can be selected. In another example, a byte-based approach can also be supported.

Instructions 1210 cause processor(s) 1216 to notify management and control components (e.g., management agent 108, storage system controller 106, interconnect layer 214, interconnect transport layer 324) that operate according to the selected traffic management approach of the selection. The notification can be provided via, for example, management messaging channels and protocols.

Instructions 1212 cause processor(s) 1216 to manage traffic over the interconnect according to the selected traffic management approach. The operations of FIG. 12 can be periodically repeated to provide dynamically adjusted traffic management over the interconnect.

Figure 13:
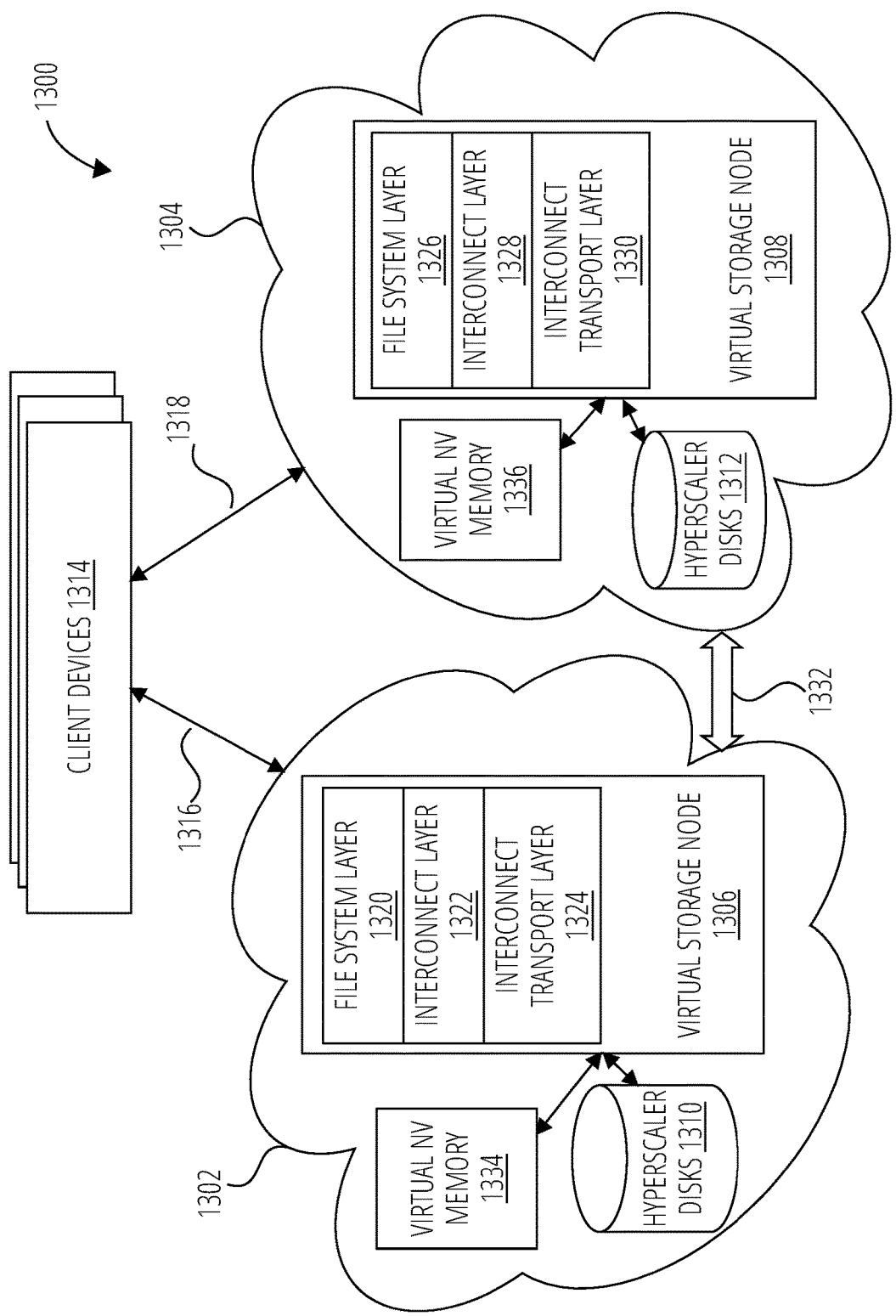
FIG. 13 is a block diagram of a cloud storage system to provide multiple communication channels between storage nodes.

FIG. 13 is a block diagram of a cloud storage system to provide multiple communication channels between storage nodes. In various examples described herein, virtual storage system 1300 may be run (e.g., on a VM or as a containerized instance, as the case may be) within a public cloud provider (e.g., hyperscaler 1302, hyperscaler 1304). In the example of FIG. 13, virtual storage system 1300 includes virtual storage node 1306 and virtual storage node 1308 and makes use of cloud disks (e.g., hyperscaler disks 1310, hyperscaler disks 1312) provided by the respective hyperscalers.

Virtual storage system 1300 may present storage over a network to client devices 1314 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Client devices 1314 may request services of virtual storage system 1300 by issuing input/output requests 1316, input/output requests 1318 (e.g., file system protocol messages (in the form of packets) over the network). A representative client of client devices 1314 may be, for example, an application, such as a database application, executing on a computer that "connects" to the virtual storage system over a computer network, such as a point-to-point channel, a shared local area network (LAN), a wide area network (WAN), or a virtual private network (VPN) implemented over a public network, such as the Internet.

In the example of FIG. 13, virtual storage system 1300 includes virtual storage node 1306 and virtual storage node 1308 with each virtual storage node being shown including a number of layers. Virtual storage node 1306 includes file system layer 1320, interconnect layer 1322, interconnect transport layer 1324. Virtual storage node 1308 includes file system layer 1326, interconnect layer 1328, interconnect transport layer 1330. These layers may represent components of data management software (not shown) of virtual storage system 1300.

The file system layer generally defines the basic interfaces and data structures in support of file system operations (e.g., initialization, mounting, unmounting, creating files, creating directories, opening files, writing to files, and reading from files). In an example, the IC layer makes use of the IC transport layer to encapsulate RDMA frames within Ethernet packets for transmission via high-availability interconnect channels 1332. The traffic management approaches described above can be utilized for traffic on high-availability interconnect channels 1332. A storage device driver may include storage device drivers for interacting with the various types of hyperscale disks (e.g., hyperscaler disks 1310, hyperscaler disks 1312) supported by the hyperscalers.

In an example, a storage node is configured to operate as part of a high availability pair when coupled with a peer node. The storage node comprises a first set of storage devices, a first management memory, a set of one or more interconnect channel interfaces, and a management agent coupled with the first set of storage devices, the first management memory and the set of one or more interconnect channel interfaces. The management agent controls data traffic between the storage node and the peer node to provide at least mirroring of the first management memory to the peer node and mirroring of a second management memory on the peer node to the storage node. The management agent controls the data traffic using a traffic control approach selected based on at least a performance evaluation of an IC fabric accessible via the set of one or more interconnect channel interfaces.

In an example, the management agent in the storage node utilizes a traffic control approach based, at least in part, on operational characteristics of a host operating environment within which the storage node and the peer node operate.

In an example, the management agent in the storage node controls the data traffic using one of: a request-based approach, a packet-based approach and a segment-based approach.

In an example, the management agent in the storage node controls the data traffic using the request-based approach by controlling traffic utilizing a maximum allowable number of outstanding IC traffic requests.

In an example, the management agent in the storage node controls the data traffic using the request-based approach by controlling traffic utilizing a maximum allowable number of outstanding IC traffic packets.

In an example, the management agent in the storage node controls the data traffic using the request-based approach by controlling traffic utilizing a maximum allowable number of outstanding IC traffic packet segments.

In an example, the storage node and the peer node communicate through one or more IC channels over the IC fabric accessible via the set of one or more interconnect channel interfaces in a non-dropping manner.

In an example, the management agent of the storage node accesses one or more remote direct memory access (RDMA) channels between the storage node and the peer node for mirroring of the first management memory to the peer node and mirroring of the second management memory on the peer node to the storage node.

In an example, a system includes a first high availability (HA) node having a first set of storage devices and a first management memory, a second HA node having a second set of storage devices and a second management memory. The first management memory is mirrored to the second HA node and the second management memory is mirrored to the first HA node. An interconnect (IC) fabric is communicatively coupled with the first HA node and with the second HA node. A management agent is coupled to control data traffic between the first HA node and the second HA node to provide a reliable connection between the first HA node and the second HA node for at least mirroring of the first management memory to the second HA node and mirroring of the second management memory to the first HA node. The management agent controls the data traffic using a traffic control approach selected based on at least a performance evaluation of the IC fabric.

In an example, the management agent of the system utilizes a traffic control approach based, at least in part, on operational characteristics of a host operating environment.

In an example, the management agent of the system controls the data traffic using one of: a request-based approach, a packet-based approach and a segment-based approach.

In an example, the management agent of the system controls the data traffic using the request-based approach by controlling traffic utilizing a maximum allowable number of outstanding IC traffic requests.

In an example, the management agent of the system controls the data traffic using the request-based approach by controlling traffic utilizing a maximum allowable number of outstanding IC traffic packets.

In an example, the management agent of the system controls the data traffic using the request-based approach by controlling traffic utilizing a maximum allowable number of outstanding IC traffic packet segments.

In an example, the reliable connection between the first HA node and the second HA node comprises one or more communication channels over the IC fabric where data is communicated in a non-dropping manner.

In an example, the IC fabric provides one or more remote direct memory access (RDMA) channels between the first HA node and the second HA node.

In an example, the data traffic between the first HA node and the second HA node comprises at least synchronization data using the one or more RDMA channels.

In an example, a management agent is configured to operate within a storage node. The management agent includes a storage interface to communicate with a first set of storage devices, a management memory interface to communicate with a first management memory, and an interconnect (IC) interface to communicate with a remote peer node. The management agent controls data traffic between the storage node and the peer node to provide at least mirroring of the first management memory to the peer node and mirroring of a second management memory on the peer node to the storage node. The management agent further controls the data traffic using a traffic control approach selected based on at least a performance evaluation of an IC fabric accessible via the IC interface.

In an example, the management agent utilizes a traffic control approach based, at least in part, on operational characteristics of a host operating environment.

In an example, the management agent controls the data traffic using one of: a request-based approach, a packet-based approach and a segment-based approach.

In an example, the request-based approach used by the management agent comprises controlling traffic utilizing a maximum allowable number of outstanding IC traffic requests.

In an example, the packet-based approach used by the management agent comprises controlling traffic utilizing a maximum allowable number of outstanding IC traffic packets.

In an example, the segment-based approach used by the management agent comprises controlling traffic utilizing a maximum allowable number of outstanding IC traffic packet segments.

In an example, the storage node and the peer node communicate over the IC fabric in a non-dropping manner.

In an example, the IC fabric provides one or more remote direct memory access (RDMA) channels between the first HA node and the second HA node.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically erasable programmable read-only memory (EEPROM), magnetic or optical cards, flash memory, or other type of computer-readable medium suitable for storing electronic instructions.

Moreover, examples may also be downloaded as a computer program product, wherein the program may be transferred from a remote computer to a requesting computer. In some examples, non-transitory computer readable storage media (e.g., non-transitory computer readable storage medium 622, non-transitory computer readable storage medium 824, non-transitory computer readable storage medium 1024, non-transitory computer readable storage medium 1218) have stored thereon data representing sequences of instructions that, when executed by one or more processors (e.g., processor(s) 620, processor(s) 822, processor(s) 1022, processor(s) 1216), cause the one or more processors to perform certain operations.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A storage node to operate as part of a high availability pair when coupled with a peer node, the storage node comprising:
   a first set of storage devices;
   a first management memory;
   a set of one or more interconnect channel (IC) interfaces that provides access to one or more ICs that provide a reliable connection to the peer node; and
   a management agent coupled with the first set of storage devices, the first management memory and the set of one or more interconnect channel interfaces, the management agent to control data traffic between the storage node and the peer node to provide at least mirroring of the first management memory to the peer node and mirroring of a second management memory on the peer node to the storage node, wherein the mirrored data comprises journal log data corresponding to modification requests received from clients since the last consistency point with a separate entry for each data modification request received from a client since the last consistency point, and the management agent controls the data traffic for mirroring data between the storage node and the peer node using a traffic control approach selected based on at least a performance evaluation of an IC fabric accessible via the set of one or more interconnect channel interfaces, wherein the management agent controls the data traffic using one of: a request-based approach utilizing a number of outstanding IC requests, a packet-based approach utilizing a number of outstanding IC packets, and a segment-based approach utilizing a number of outstanding IC packet segments.

2. The storage node of claim 1 wherein the management agent utilizes a traffic control approach based, at least in part, on operational characteristics of a host operating environment within which the storage node and the peer node operate in addition to the performance evaluation of an IC fabric accessible via the set of one or more interconnect channel interfaces.

3. The storage node of claim 1 wherein the request-based approach comprises controlling traffic utilizing a maximum allowable number of outstanding IC traffic requests.

4. The storage node of claim 1 wherein the packet-based approach comprises controlling traffic utilizing a maximum allowable number of outstanding IC traffic packets.

5. The storage node of claim 1 wherein the segment-based approach comprises controlling traffic utilizing a maximum allowable number of outstanding IC traffic packet segments.

6. The storage node of claim 1 wherein the storage node and the peer node communicate through one or more IC channels over the IC fabric accessible via the set of one or more interconnect channel interfaces in a non-dropping manner.

7. The storage node of claim 1 wherein the management agent accesses one or more remote direct memory access (RDMA) channels between the storage node and the peer node for mirroring of the first management memory to the peer node and mirroring of the second management memory on the peer node to the storage node.

8. A system comprising:
a first high availability (HA) node having a first set of storage devices and a first management memory;
a second HA node having a second set of storage devices and a second management memory, wherein the first management memory is mirrored to the second HA node and the second management memory is mirrored to the first HA node; and
an interconnect (IC) fabric communicatively coupled with the first HA node and with the second HA node;
a management agent coupled to control data traffic between the first HA node and the second HA node to provide a reliable connection between the first HA node and the second HA node for at least mirroring of the first management memory to the second HA node and mirroring of the second management memory to the first HA node, wherein the mirrored data comprises journal log data corresponding to modification requests received from clients since the last consistency point with a separate entry for each data modification request received from a client since the last consistency point, and the management agent controls the data traffic for mirroring data between the storage node and the peer node using a traffic control approach selected based on at least a performance evaluation of the IC fabric, wherein the management agent controls the data traffic using one of: a request-based approach utilizing a number of outstanding IC requests, a packet-based approach utilizing a number of outstanding IC packets, and a segment-based approach utilizing a number of outstanding IC packet segments.

9. The system of claim 8 wherein the management agent utilizes a traffic control approach based, at least in part, on operational characteristics of a host operating environment in addition to the performance evaluation of an IC fabric.

10. The system of claim 8 wherein the request-based approach comprises controlling traffic utilizing a maximum allowable number of outstanding IC traffic requests.

11. The system of claim 8 wherein the packet-based approach comprises controlling traffic utilizing a maximum allowable number of outstanding IC traffic packets.

12. The system of claim 8 wherein the segment-based approach comprises controlling traffic utilizing a maximum allowable number of outstanding IC traffic packet segments.

13. The system of claim 8 wherein the reliable connection between the first HA node and the second HA node comprises one or more communication channels over the IC fabric where data is communicated in a non-dropping manner.

14. The system of claim 8 wherein the IC fabric provides one or more remote direct memory access (RDMA) channels between the first HA node and the second HA node.

15. The system of claim 14 wherein the data traffic between the first HA node and the second HA node comprises at least synchronization data using the one or more RDMA channels.

16. A system:
a storage interface to communicate with a first set of storage devices;
a management memory interface to communicate with a first management memory device;
an interconnect (IC) interface to communicate with a remote peer hardware storage node that provides access to one or more physical IC channels that provide a reliable connection to the peer node;
a management agent physically coupled with the storage interface, the management memory interface and the IC interface, wherein the management agent controls data traffic between the hardware storage node and the remote peer hardware storage node over the one or more physical IC channels to provide at least mirroring of a first management memory to the peer node and mirroring of a second management memory on the peer node to the storage node, wherein the management agent further controls the data traffic for mirroring data between the storage node and the peer node using a traffic control approach selected based on at least a performance evaluation of an IC fabric accessible via the IC interface, wherein the mirrored data comprises journal log data corresponding to modification requests received from clients since the last consistency point with a separate entry for each data modification request received from a client since the last consistency point, and the management agent controls the data traffic using one of: a request-based approach utilizing a number of outstanding IC requests, a packet-based approach utilizing a number of outstanding IC packets, and a segment-based approach utilizing a number of outstanding IC packet segments.

17. The management agent of claim 16 wherein the management agent utilizes a traffic control approach based, at least in part, on operational characteristics of a host operating environment.

18. The management agent of claim 16 wherein the request-based approach comprises controlling traffic utilizing a maximum allowable number of outstanding IC traffic requests.

19. The management agent of claim 16 wherein the packet-based approach comprises controlling traffic utilizing a maximum allowable number of outstanding IC traffic packets.

20. The management agent of claim 16 wherein the segment-based approach comprises controlling traffic utilizing a maximum allowable number of outstanding IC traffic packet segments.

21. The management agent of claim 16 wherein the storage node and the peer node communicate over the IC fabric in a non-dropping manner.

22. The management agent of claim 16 wherein the IC fabric provides one or more remote direct memory access (RDMA) channels between the first HA node and the second HA node.

* * * * *